United States Patent
Zhang et al.

(10) Patent No.: US 11,750,430 B2
(45) Date of Patent: Sep. 5, 2023

(54) LINK SPECIFIC GUARD INTERVAL

(71) Applicant: QUALCOMM Incorporated, San Diego, CA (US)

(72) Inventors: Xiaoxia Zhang, San Diego, CA (US); Jun Ma, San Diego, CA (US); Morteza Soltani, San Diego, CA (US); Raviteja Patchava, San Diego, CA (US); Jing Sun, San Diego, CA (US); Iyab Issam Sakhnini, San Diego, CA (US); Tao Luo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/446,593

(22) Filed: Aug. 31, 2021

(65) Prior Publication Data
US 2023/0065940 A1    Mar. 2, 2023

(51) Int. Cl.
*H04L 27/26* (2006.01)
*H04L 5/00* (2006.01)
*H04W 92/18* (2009.01)

(52) U.S. Cl.
CPC ........ *H04L 27/2607* (2013.01); *H04L 5/0051* (2013.01); *H04L 27/2613* (2013.01); *H04L 27/2636* (2013.01); *H04W 92/18* (2013.01)

(58) Field of Classification Search
CPC ............... H04L 25/03006; H04L 27/26; H04L 27/2601; H04L 27/2605
See application file for complete search history.

(56) References Cited

U.S. PATENT DOCUMENTS

| | | | |
|---|---|---|---|
| 2007/0171810 A1* | 7/2007 | Suda ................. | H04L 25/03006 370/208 |
| 2021/0068196 A1* | 3/2021 | Akkarakaran ........ | H04W 76/27 |
| 2022/0124657 A1* | 4/2022 | Baldemair ........ | H04W 56/0015 |

* cited by examiner

*Primary Examiner* — Melvin C Marcelo
*Assistant Examiner* — Natali Pascual Peguero
(74) *Attorney, Agent, or Firm* — Qualcomm Incorporated

(57) ABSTRACT

Various aspects of the present disclosure generally relate to wireless communication. In some aspects, a user equipment (UE) may receive first configuration information indicating a first guard interval associated with sidelink communications. The UE may transmit, to a base station and another UE, a first sidelink communication using the first guard interval. The UE may transmit, to the base station and using a second guard interval having a second length that is different from a first length of the first guard interval, an uplink communication. Numerous other aspects are described.

30 Claims, 14 Drawing Sheets

LINK SPECIFIC GUARD INTERVAL

FIELD OF THE DISCLOSURE

Aspects of the present disclosure generally relate to wireless communication and to techniques and apparatuses for communicating with link specific guard intervals.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving first configuration information indicating a first guard interval associated with sidelink communications. The method may include transmitting, to a base station and another UE, a first sidelink communication using the first guard interval. The method may include transmitting, to the base station and using a second guard interval having a second length that is different from a first length of the first guard interval, an uplink communication.

Some aspects described herein relate to a method of wireless communication performed by a base station. The method may include receiving, from a first UE, a first sidelink communication using a first guard interval. The method may include receiving, from a second UE, an uplink communication using a second guard interval, a second length of the second guard interval being different from a first length of the first guard interval. The method may include processing the first sidelink communication and the uplink communication in a same fast Fourier transform window.

Some aspects described herein relate to a method of wireless communication performed by a wireless device. The method may include receiving, from a first UE, a first sidelink communication using a first guard interval. The method may include receiving, from a second UE, a second sidelink communication using a second guard interval, a second length of the second guard interval being different from a first length of the first guard interval. The method may include processing the first sidelink communication and the second sidelink communication in a same fast Fourier transform window.

Some aspects described herein relate to a UE for wireless communication. The user equipment may include a memory and one or more processors coupled to the memory. The one or more processors may be configured to receive first configuration information indicating a first guard interval associated with sidelink communications. The one or more processors may be configured to transmit, to a base station and another UE, a first sidelink communication using the first guard interval. The one or more processors may be configured to transmit, to the base station and using a second guard interval having a second length that is different from a first length of the first guard interval, an uplink communication.

Some aspects described herein relate to a base station for wireless communication. The base station may include a memory and one or more processors coupled to the memory. The one or more processors may be configured to receive, from a first UE, a first sidelink communication using a first guard interval. The one or more processors may be configured to receive, from a second UE, an uplink communication using a second guard interval. The one or more processors may be configured to process the first sidelink communication and the uplink communication in a same fast Fourier transform window.

Some aspects described herein relate to a wireless device for wireless communication. The wireless device may include a memory and one or more processors coupled to the memory. The one or more processors may be configured to receive, from a first UE, a first sidelink communication using a first guard interval. The one or more processors may be configured to receive, from a second UE, a second sidelink communication using a second guard interval. The one or more processors may be configured to process the first sidelink communication and the second sidelink communication in a same fast Fourier transform window.

Some aspects described herein relate to a non-transitory computer-readable medium that stores a set of instructions for wireless communication by a UE. The set of instructions, when executed by one or more processors of the UE, may cause the UE to receive first configuration information indicating a first guard interval associated with sidelink communications. The set of instructions, when executed by one or more processors of the UE, may cause the UE to transmit, to a base station and another UE, a first sidelink communication using the first guard interval. The set of instructions, when executed by one or more processors of the UE, may cause the UE to transmit, to the base station and using a second guard interval having a second length that is different from a first length of the first guard interval, an uplink communication.

Some aspects described herein relate to a non-transitory computer-readable medium that stores a set of instructions for wireless communication by a base station. The set of instructions, when executed by one or more processors of the base station, may cause the base station to receive, from a first UE, a first sidelink communication using a first guard interval. The set of instructions, when executed by one or more processors of the base station, may cause the base station to receive, from a second UE, an uplink communication using a second guard interval. The set of instructions, when executed by one or more processors of the base station, may cause the base station to process the first sidelink communication and the uplink communication in a same fast Fourier transform window.

Some aspects described herein relate to a non-transitory computer-readable medium that stores a set of instructions for wireless communication by a wireless device. The set of instructions, when executed by one or more processors of the wireless device, may cause the wireless device to receive, from a first UE, a first sidelink communication using a first guard interval. The set of instructions, when executed by one or more processors of the wireless device, may cause the wireless device to receive, from a second UE, a second sidelink communication using a second guard interval. The set of instructions, when executed by one or more processors of the wireless device, may cause the wireless device to process the first sidelink communication and the second sidelink communication in a same fast Fourier transform window.

Some aspects described herein relate to an apparatus for wireless communication. The apparatus may include means for receiving first configuration information indicating a first guard interval associated with sidelink communications. The apparatus may include means for transmitting, to a base station and another UE, a first sidelink communication using the first guard interval. The apparatus may include means for transmitting, to the base station and using a second guard interval having a second length that is different from a first length of the first guard interval, an uplink communication.

Some aspects described herein relate to an apparatus for wireless communication. The apparatus may include means for receiving, from a first UE, a first sidelink communication using a first guard interval. The apparatus may include means for receiving, from a second UE, an uplink communication using a second guard interval, a second length of the second guard interval being different from a first length of the first guard interval. The apparatus may include means for processing the first sidelink communication and the uplink communication in a same fast Fourier transform window.

Some aspects described herein relate to an apparatus for wireless communication. The apparatus may include means for receiving, from a first UE, a first sidelink communication using a first guard interval. The apparatus may include means for receiving, from a second UE, a second sidelink communication using a second guard interval, a second length of the second guard interval being different from a first length of the first guard interval. The apparatus may include means for processing the first sidelink communication and the second sidelink communication in a same fast Fourier transform window.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
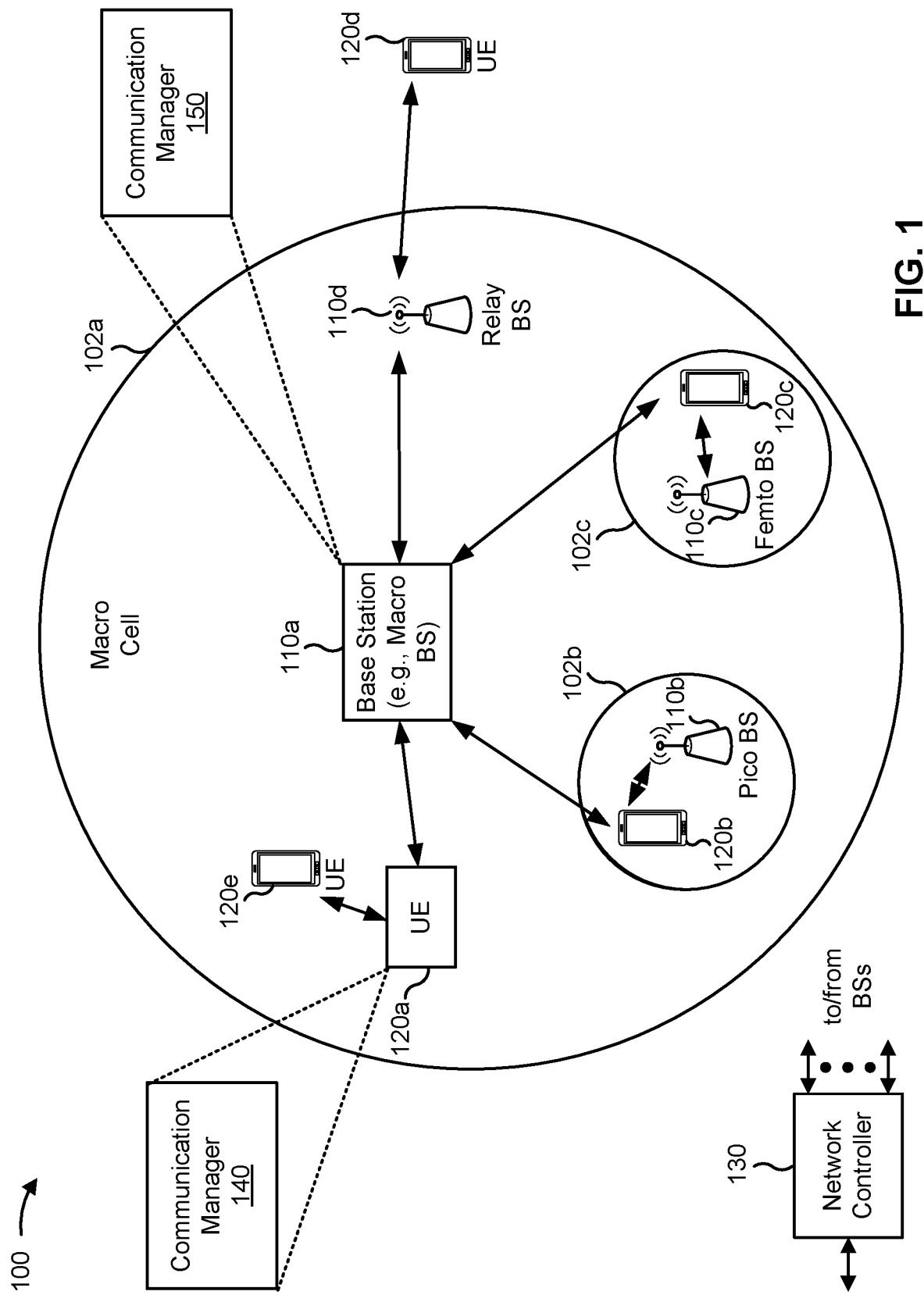
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive first configuration information indicating a first guard interval associated with sidelink communications; transmit, to a base station and another UE, a first sidelink communication using the first guard interval; and transmit, to the base station and using a second guard interval having a second length that is different from a first length of the first guard interval, an uplink communication. Additionally, or alternatively, the communication manager 140 may perform one or more other operations described herein. For example, the communication manager 140 may receive, from a first UE, a first sidelink communication using a first guard interval; receive, from a second UE, a second sidelink communication using a second guard interval, a second length of the second guard interval being different from a first length of the first guard interval; and process the first sidelink communication and the second sidelink communication in a same FFT window.

In some aspects, the base station 110 may include a communication manager 150. As described in more detail elsewhere herein, the communication manager 150 may receive, from a first UE, a first sidelink communication using a first guard interval; receive, from a second UE, an uplink communication using a second guard interval, a second length of the second guard interval being different from a first length of the first guard interval; and process the first sidelink communication and the uplink communication in a same fast Fourier transform window. Additionally, or alternatively, the communication manager 150 may perform one or more other operations described herein. For example, the communication manager 150 may receive, from a first UE, a first sidelink communication using a first guard interval; receive, from a second UE, a second sidelink communication using a second guard interval, a second length of the second guard interval being different from a first length of the first guard interval; and process the first sidelink communication and the second sidelink communication in a same FFT window.

As indicated above, FIG. 1 is provided as an example. Other examples may differ from what is described with regard to FIG. 1.

Figure 2:
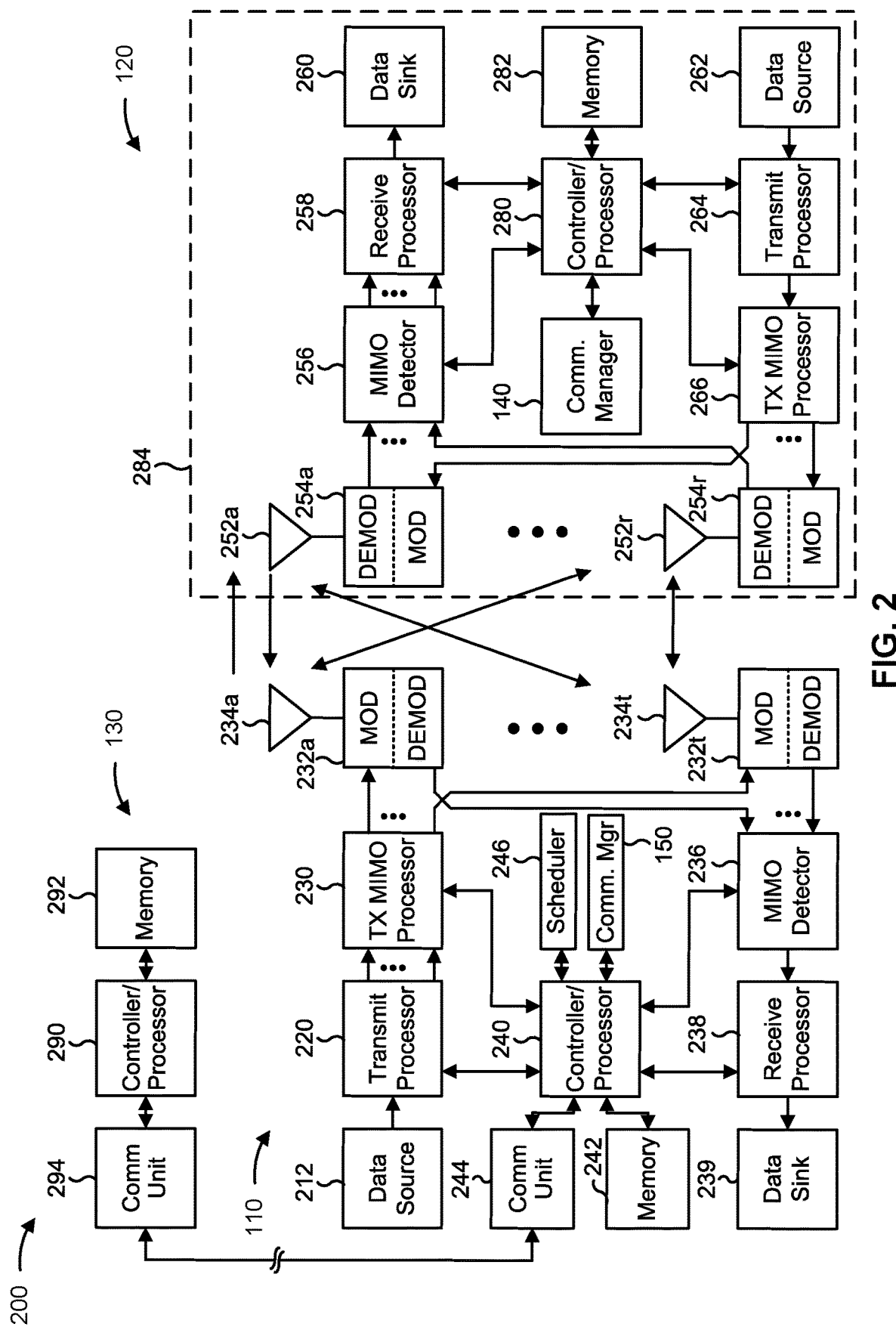
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-14).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-14).

The controller/processor 240 of the base station 110, the controller/processor 280 of the UE 120, and/or any other component(s) of FIG. 2 may perform one or more techniques associated with communicating with link specific guard intervals, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10, process 1100 of FIG. 11, process 1200 of FIG. 12, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, the UE includes means for receiving first configuration information indicating a first guard interval associated with sidelink communications (e.g., using antenna 252, modem 254, MIMO detector 256, receive processor 258, controller/processor 280, memory 282, or the like); means for transmitting, to a base station and another UE, a first sidelink communication using the first guard interval (e.g., using controller/processor 280, transmit processor 264, TX MIMO processor 266, modem 254, antenna 252, memory 282, or the like); and/or means for transmitting, to the base station and using a second guard interval having a second length that is different from a first length of the first guard interval, an uplink communication (e.g., using controller/processor 280, transmit processor 264, TX MIMO processor 266, modem 254, antenna 252, memory 282, or the like). The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for receiving, from a first UE, a first sidelink communication using a first guard interval (e.g., using antenna 234, modem 232, MIMO detector 236, receive processor 238, controller/processor 240, memory 242, or the like); means for receiving, from a second UE, an uplink communication using a second guard interval, a second length of the second guard interval being different from a first length of the first guard interval (e.g., using antenna 234, modem 232, MIMO detector 236, receive processor 238, controller/processor 240, memory 242, or the like); and/or means for processing the first sidelink communication and the uplink communication in a same fast Fourier transform window (e.g., using controller/processor 240, memory 242, or the like). The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the wireless device includes means for receiving, from a first UE, a first sidelink communication using a first guard interval (e.g., using antenna 252, modem 254, MIMO detector 256, receive processor 258, controller/processor 280, memory 282, or the like); means for receiving, from a second UE, a second sidelink communication using a second guard interval, a second length of the second guard interval being different from a first length of the first guard interval (e.g., using antenna 252, modem 254, MIMO detector 256, receive processor 258, controller/processor 280, memory 282, or the like); and/or means for processing the first sidelink communication and the second sidelink communication in a same FFT window (e.g., using controller/processor 280, memory 282, or the like). In some aspects, the means for the wireless device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the wireless device to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
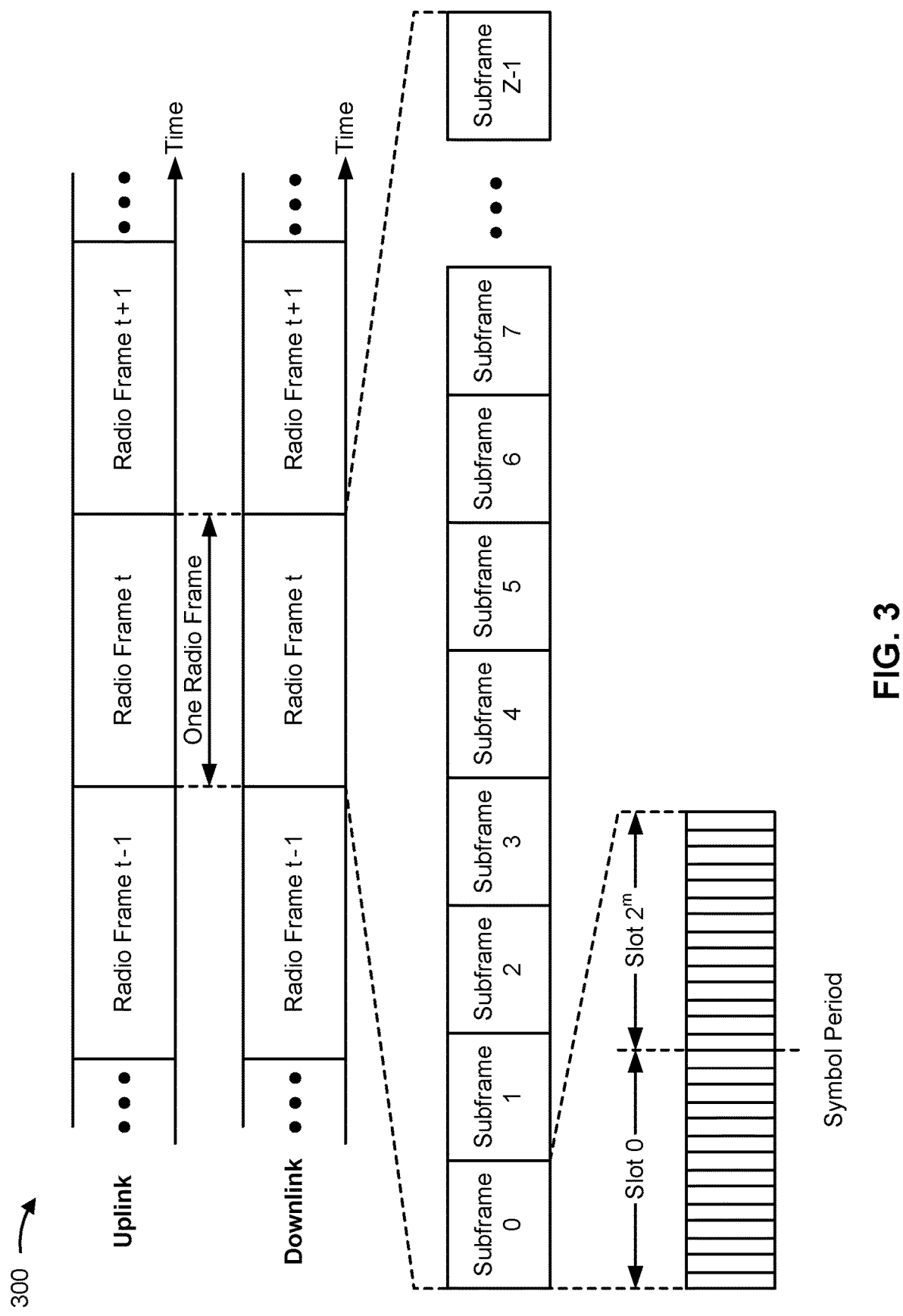
FIG. 3 is a diagram illustrating an example of a frame structure in a wireless communication network, in accordance with the present disclosure.

FIG. 3 is a diagram illustrating an example 300 of a frame structure in a wireless communication network, in accordance with the present disclosure. The frame structure shown in FIG. 3 is for frequency division duplexing (FDD) in a telecommunication system, such as LTE or NR. The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., 2 m slots per subframe are shown in FIG. 3, where m is an index of a numerology used for a transmission, such as 0, 1, 2, 3, 4, or another number). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, mini-slot based, or symbol-based.

As indicated above, FIG. 3 is provided as an example. Other examples may differ from what is described with respect to FIG. 3.

Figure 4:
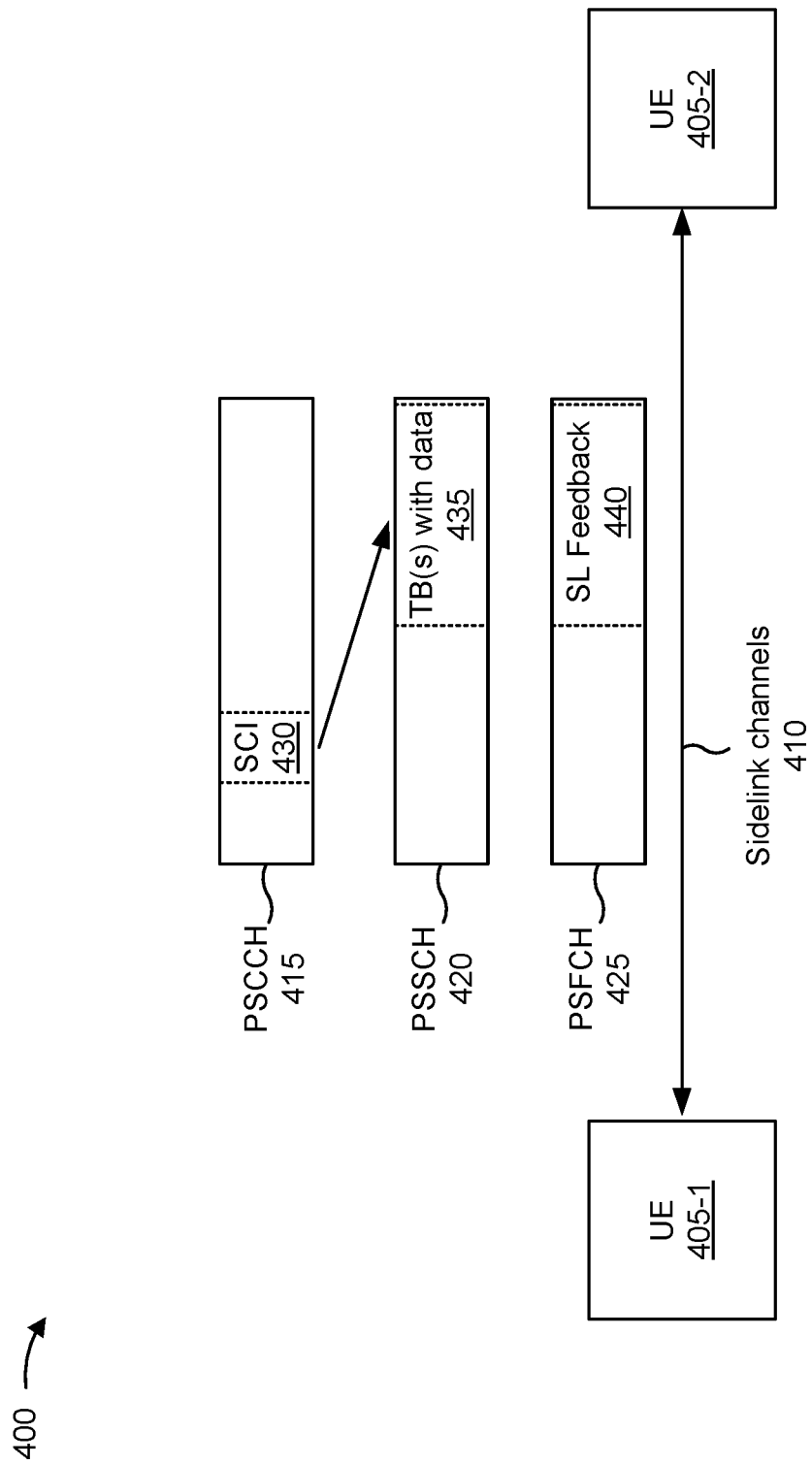
FIG. 4 is a diagram illustrating an example of sidelink communications, in accordance with the present disclosure.

FIG. 4 is a diagram illustrating an example 400 of sidelink communications, in accordance with the present disclosure.

As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (e.g., which may include V2V communications, V2I communications, and/or V2P communications) and/or mesh networking. In some aspects, the UEs 405 (e.g., UE 405-1 and/or UE 405-2) may correspond to one or more other UEs described elsewhere herein, such as UE 120. In some aspects, the one or more sidelink channels 410 may use a PC5 interface and/or may operate in a high frequency band (e.g., the 5.9 GHz band). Additionally, or alternatively, the UEs 405 may synchronize timing of transmission time intervals (TTIs) (e.g., frames, subframes, slots, or symbols) using global navigation satellite system (GNSS) timing.

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a physical downlink control channel (PDCCH) and/or a physical uplink control channel (PUCCH) used for cellular communications with a base station 110 via an access link or an access channel. The PSSCH 420 may be used to communicate data, similar to a physical downlink shared channel (PDSCH) and/or a physical uplink shared channel (PUSCH) used for cellular communications with a base station 110 via an access link or an access channel. For example, the PSCCH 415 may carry sidelink control information (SCI) 430, which may indicate various control information used for sidelink communications, such as one or more resources (e.g., time resources, frequency resources, and/or spatial resources) where a transport block (TB) 435 may be carried on the PSSCH 420. The TB 435 may include data. The PSFCH 425 may be used to communicate sidelink feedback 440, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 415, in some aspects, the SCI 430 may include multiple communications in different stages, such as a first stage SCI (SCI-1) and a second stage SCI (SCI-2). The SCI-1 may be transmitted on the PSCCH 415. The SCI-2 may be transmitted on the PSSCH 420. The SCI-1 may include, for example, an indication of one or more resources (e.g., time resources, frequency resources, and/or spatial resources) on the PSSCH 420, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 420, such as a hybrid automatic repeat request (HARQ) process ID, a new data indicator (NDI), a source identifier, a destination identifier, and/or a channel state information (CSI) report trigger.

In some aspects, the one or more sidelink channels 410 may use resource pools. For example, a scheduling assignment (e.g., included in SCI 430) may be transmitted in sub-channels using specific resource blocks (RBs) across time. In some aspects, data transmissions (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 405 may operate using a transmission mode where resource selection and/or scheduling is performed by the UE 405 (e.g., rather than a base station 110). In some aspects, the UE 405 may perform resource selection and/or scheduling by sensing channel availability for transmissions. For example, the UE 405 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources and/or channel parameters. Additionally, or alternatively, the UE 405 may perform resource selection and/or scheduling by determining a channel busy rate (CBR) associated with various sidelink channels, which may be used for rate control (e.g., by indicating a maximum number of resource blocks that the UE 405 can use for a particular set of subframes).

In the transmission mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, and/or a modulation and coding scheme (MCS) to be used for the upcoming sidelink transmission. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

As indicated above, FIG. 4 is provided as an example. Other examples may differ from what is described with respect to FIG. 4.

Figure 5:
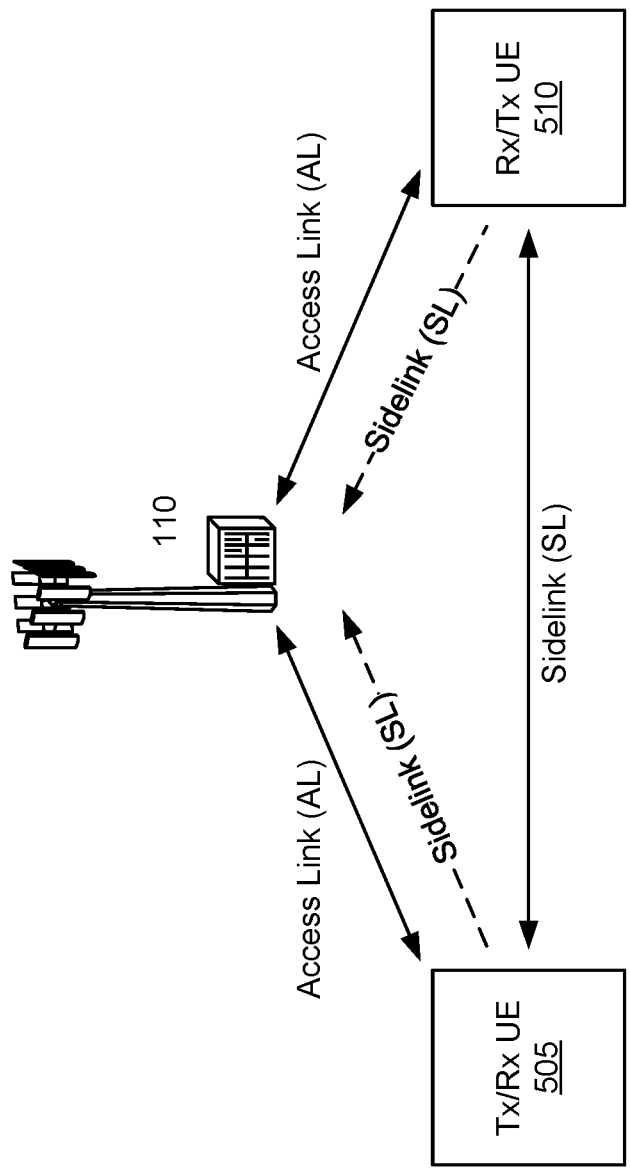
FIG. 5 is a diagram illustrating an example of sidelink communications and access link communications, in accordance with the present disclosure.

FIG. 5 is a diagram illustrating an example 500 of sidelink communications and access link communications, in accordance with the present disclosure.

As shown in FIG. 5, a transmitter (Tx)/receiver (Rx) UE 505 and an Rx/Tx UE 510 may communicate with one another via a sidelink, as described above in connection with FIG. 4. As further shown, in some sidelink modes, a base station 110 may communicate with the Tx/Rx UE 505 via a first access link. Additionally, or alternatively, in some sidelink modes, the base station 110 may communicate with the Rx/Tx UE 510 via a second access link. The Tx/Rx UE 505 and/or the Rx/Tx UE 510 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

In some aspects, the base station 110 may receive sidelink communications from UEs, such as Tx/Rx UE 505 and/or Rx/Tx UE 510. For example, the transmission of sidelink communications may be detectable by the base station 110, which may enable the base station to monitor sidelink transmissions (e.g., PSSCH and/or PSFCH) for quality indicators and enable the base station to improve sidelink reliability (e.g., by reconfiguring UEs communicating via the sidelink).

As indicated above, FIG. 5 is provided as an example. Other examples may differ from what is described with respect to FIG. 5.

Figure 6:
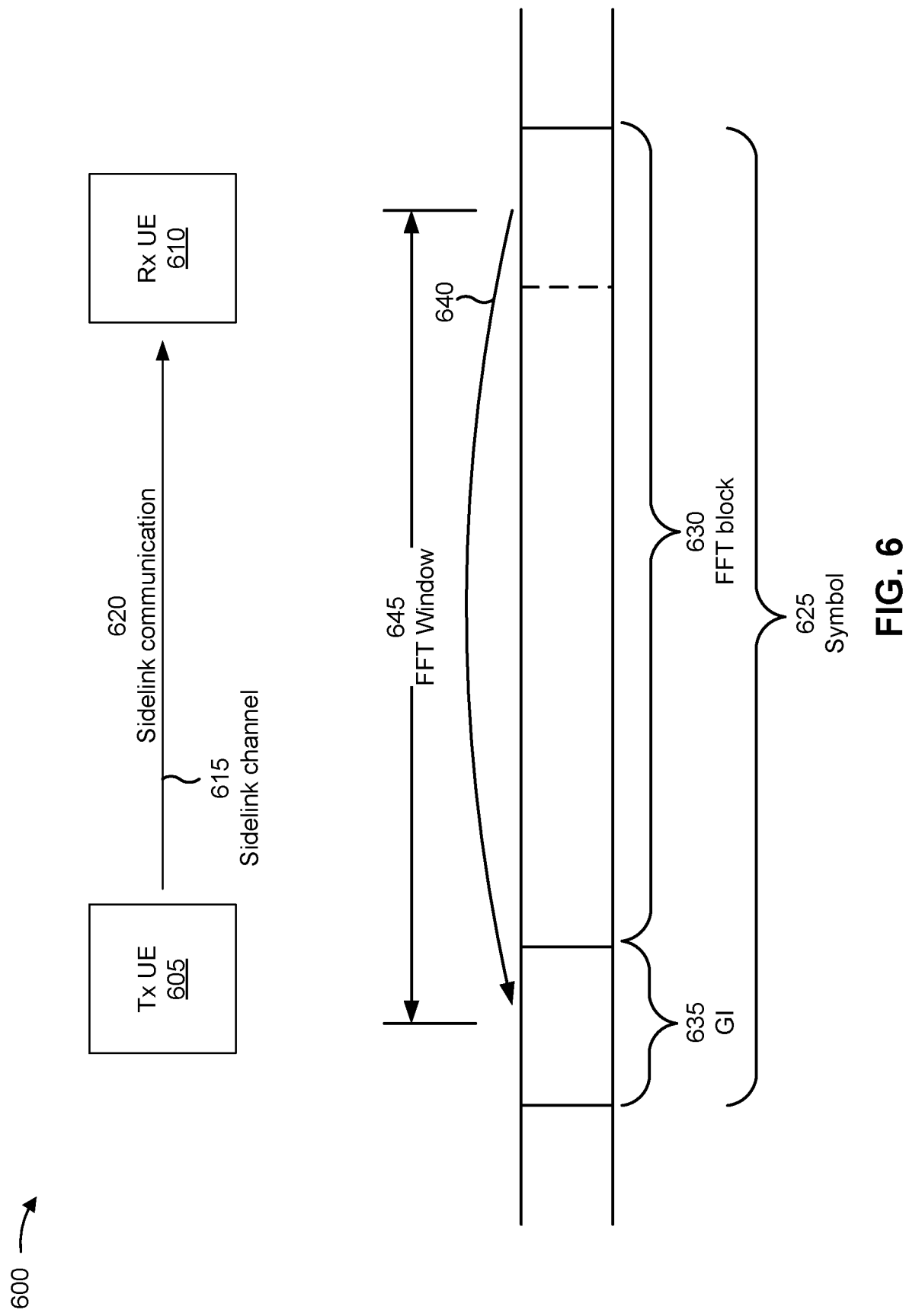
FIG. 6 is a diagram illustrating an example of a sidelink communication symbol structure, in accordance with the present disclosure.

FIG. 6 is a diagram illustrating an example 600 of a sidelink communication symbol structure. As shown in FIG. 6, a transmitter (Tx) UE 605 and a receiver (Rx) UE 610 may communicate using a sidelink channel 615 (e.g., in a similar manner to that described above). For example, as shown by reference number 620, the Tx UE 605 may transmit a sidelink communication or signal to the Rx UE 610 using the sidelink channel 615.

As shown by reference number 625, an example symbol associated with the sidelink communication is depicted. As shown by reference number 630, the symbol may include a fast Fourier transform (FFT) block. The FFT block may include data (e.g., data samples) associated with the communication or signal. The FFT block may also be referred to as a data block. As shown by reference number 635, the symbol may include a guard interval (GI). As shown by reference number 640, the GI may be a copy of a portion of the FFT block of the symbol (e.g., shown by the dashed line in FIG. 6). For example, the GI of the symbol may be obtained by prepending a copy of the last N data samples from the end of the FFT block to the beginning of the FFT block. In this way, the symbol structure may result in a circular signal structure, such that the first N data samples and last N data samples of the symbol are identical. A GI may be used for a communication to avoid inter-symbol interference (ISI) between adjacent symbols in multipath channel environments. A transmitting device (e.g., the Tx UE 605) may transmit a symbol that may arrive at a receiving device (e.g., the Rx UE 610) with multiple replicas through different channel paths that have different propagation delays, and vice versa. If a duration of the GI is sufficiently large, there may be a window that contains a complete symbol from each replica so that ISI does not emerge within this window at the receiving device.

In some cases, a cyclic prefix (CP) may be used as an alternative to a GI to achieve the circular signal structure, maintain symbol and/or slot alignment, and enable one tap frequency domain equalization (FDE) at the receiving device. A CP may include random data, may begin outside of a corresponding symbol (and be reproduced at the end of the symbol), and may be fully contained within a slot, whereas the first GI of a slot may precede the slot.

As shown by reference number 645, an FFT window may be used by the Rx UE 610 to obtain data samples for performing frequency domain processing (e.g., for performing an FFT operation, for performing demodulation, and/or for performing decoding) of the signal. For example, the Rx UE 610 may use the data samples within the FFT window for frequency domain processing of the signal. A timing of the FFT window may be determined to minimize ISI due to interfering signals arriving at the beginning of the symbol (e.g., during the CP) and/or due to interfering signals arriving at the end of the symbol (e.g., associated with a subsequent symbol). As the data included in the CP may be identical to the data at the end of the FFT block, the Rx UE 610 may obtain all of the data included in the FFT block using the FFT window (e.g., that includes data from the CP and data from the FFT block). For example, the data obtained during the FFT window may be cyclic shifted from the data included in the FFT block of the symbol. As a result, the Rx UE 610 may obtain all of the data samples of the symbol while also minimizing ISI by using the FFT window as shown. In sidelink communication systems, a timing of the FFT window may be based at least in part on GNSS timing of the Rx UE 610.

When communicating via sidelink, uplink, or downlink, the transmitter and receiver may communicate to coordinate the timing of the FFT window at the receiver, as the channel conditions and timing offset between the transmitter and receiver can be determined to optimize the timing of the FFT window. For example, uplink transmissions to the base station may be configured to use a timing advance (TA) designed to account for a delay between transmission of an uplink communication and receipt of the uplink communication by the base station. The TA may be used, for example, to better align the uplink communications received by, and the downlink communications transmitted by, the base station (e.g., to reduce inter-symbol interference that may result from the uplink frames and downlink frames not aligning in the time domain at the base station). Similarly, the TA may be used for sidelink communications to better align sidelink communications.

For example, the base station may transmit a TA command indicating the $N_{TA}$ value. The TA command may be transmitted as part of a random access channel (RACH) procedure (e.g., in a random access response (RAR) message of a RACH procedure). In some aspects, the TA command may be indicated in a MAC-CE message. The $N_{TA}$ value may account for propagation delay and may be based at least in part on an amount of time an uplink transmission from the UE takes to reach the base station (e.g., may be based at least in part on a distance between the UE and the base station).

The UE may determine the amount of time before the start of a downlink frame at which a corresponding uplink frame is to start based at least in part on the TA. For example, the UE may determine the amount of time according to the formula: $T_{TA}=(N_{TA}+N_{(TA\ offset)})T_c$, where $T_{TA}$ is the total TA, $N_{TA}$ accounts for propagation delay, $N_{(TA\ offset)}$ is a TA offset value, and $T_c$ is a timing constant, where both the TA offset value and the timing constant may be defined by the 3GPP Specifications. In a sidelink environment, $N_{(TA)}$ may be replaced by $N_{TA,SL}$, such that in a sidelink scenario, the total TA may be determined according to the formula $T_{TA}=(N_{TA,SL}+N_{(TA\ offset)})T_c$. $T_c$ may be based at least in part on a maximum subcarrier spacing and fast Fourier transform (FFT) size of the wireless network. In some cases, $T_c$ may have a value of 0.509 nanoseconds, among other examples. The TA offset value ($N_{(TA\ offset)}$) may be based at least in part on a frequency band or topology (e.g., FDD or time division duplexing (TDD)) that is being used for communications between the UE and the base station. The TA offset value may be defined, or otherwise fixed, by the 3GPP Specifications. In some examples, the TA offset may be 13 μs for FR1 and 7 μs for FR2. While the $N_{TA}$ value may be based at least in part on an amount of time an uplink transmission from the UE takes to reach the base station, in a sidelink environment, the TA (e.g., $N_{TA,SL}$) may be defined, or otherwise fixed, by the 3GPP Specifications. In some examples, $N_{TA,SL}$ may be 0. In some cases, the sidelink timing advance may be defined as zero based on various factors, even though there will typically be some propagation delay between UEs during sidelink communication, because it is assumed that the UEs may be in close proximity to each other and propagation delay may be relatively low. Furthermore, on a given slot, one transmitter may need to transmit to multiple receivers. However, it is not feasible for a transmitter to use different timing advances for a single transmission. Additionally, diverse timing advances used by multiple devices can complicate matters for some frequency division multiplexing schemes. There is also no clear process (e.g., no RACH process) on the sidelink for timing advances to be determined.

Due to differences in timing between sidelink communications (where total timing advance may correspond to $N_{TA,SL}+N_{(TA\ offset)}$, but in cases where $N_{TA,SL}$ is defined as zero) and Uu communications (e.g., uplink/downlink communications between a base station and UE where the total timing advance is $N_{TA}+N_{(TA\ offset)}$), sidelink signals received by a base station may fall outside of the GI or CP, which may cause interference and/or may require additional processing (e.g., additional FFT processing) if the Uu and sidelink communications received by the base station are not aligned (e.g., within an FFT window). In some scenarios, for example where the transmitting UE is far from the base station (such as where $N_{TA}$ is very large), setting $N_{TA,SL}$ to zero can result in serious misalignment. Similarly, a UE that communicates via multiple sidelink channels may receive sidelink communications that have different propagation delays (e.g., based on different channel conditions and/or different distances between the UE and the multiple other UEs with which it is communicating via the multiple sidelink channels), which may also result in one or more sidelink communications being received outside of the GI or CP, which may also cause interference and/or may require additional processing if the sidelink communications received by the UE are not aligned.

As indicated above, FIG. 6 is provided as an example. Other examples may differ from what is described with respect to FIG. 6.

Some techniques and apparatuses described herein overcome challenges with timing using modified waveform design by enabling link specific guard intervals (GIs) to be configured, such that different links may use different GIs, enabling a receiving device (e.g., a base station or UE) to receive multiple communications aligned in the time domain via different links. For example, a base station may receive a sidelink communication using a first GI, and an uplink communication using a second GI. The different GIs may align the sidelink and uplink communications, which may reduce interference and enable the base station to process the communications in the same FFT window. Similarly, a UE may receive two sidelink communications from two different UEs with two different GIs. The different GIs may align the sidelink communications, which may reduce interference and enable the UE to process the sidelink communications in the same FFT window. As a result, the reduction in interference may improve the quality of sidelink and Uu communications, reducing bandwidth that would be wasted on retransmitting interfering signals. In addition, the ability to use one FFT window for processing multiple communications may improve the processing efficiency of devices that receive multiple communications that are aligned using link specific GIs. Reducing the need for additional transmissions and/or additional processing may also conserve power resources consumed by both transmitters and receivers. Furthermore, by using link specific GIs, rather than a fixed GI or CP for all communications, overhead may be reduced by enabling some communications to use a shorter GI, which may enable the communications using the short GI to include more data per symbol, reducing overhead and increasing efficiency.

Figure 7:
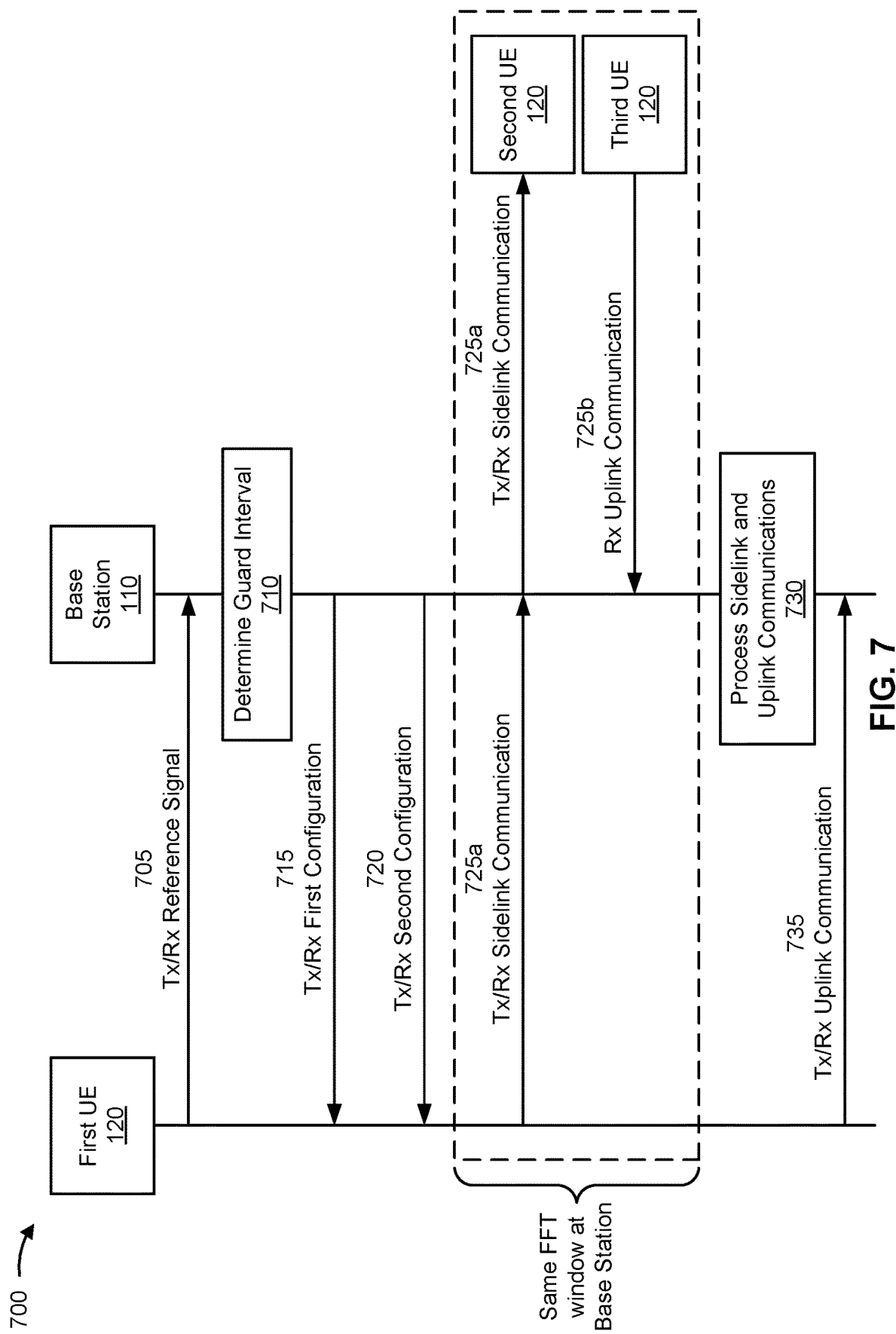
FIG. 7 is a diagram illustrating an example associated with communicating with link specific guard intervals, in accordance with the present disclosure.

FIG. 7 is a diagram illustrating an example 700 associated with communicating with link specific guard intervals, in accordance with the present disclosure. As shown in FIG. 7, a UE (e.g., first UE, UE 120) may communicate (e.g., transmit an uplink transmission and/or sidelink transmission, and/or receive a downlink transmission) with a base station (e.g., base station 110). In some aspects, the UE may communicate with the base station and/or one or more other UEs (e.g., second UE, third UE) via one or more sidelink communications (e.g., in addition to, or in place of, communicating with the base station). The UE and the base station may be part of a wireless network (e.g., wireless network 100). While various steps are described as taking place between the first UE and the base station, any steps performed between the first UE and the base station may also be performed between the second UE and the base station and/or the third UE and the base station. In addition, any steps performed between the second UE and the base station and/or the third UE and the base station may be performed between the first UE and the base station.

As shown by reference number 705, the UE may transmit, and the base station may receive, a reference signal. In some aspects, the reference signal may include a sounding reference signal (SRS), a demodulation reference signal (DMRS), or a phase tracking reference signal (PTRS), among other examples. As another example, the reference signal may be associated with a random access channel (RACH) procedure and/or channel state information (CSI) reporting, such as a channel quality indicator (CQI), a precoding matrix indicator (PMI), a CSI reference signal (CSI-RS) resource indicator (CRI), a layer indicator (LI), a rank indicator (RI), or a reference signal received power (RSRP), among other examples. In some aspects, the reference signals may be associated with a sidelink channel between the UE and another UE.

As shown by reference number 710, the base station may determine a first GI based at least in part on the reference signal. For example, as described herein, the reference signal may be used to identify a propagation delay associated with communications between the UE and the base station. In some aspects, the base station may use the propagation delay to determine the TA that the UE should use to transmit uplink communications to the base station. In some aspects, the base station may use the TA to determine a length of the GI to be used by the UE when transmitting uplink communications to the base station. For example, the base station may determine that the first GI length should be sufficient to align the symbols of an uplink transmission at the base station when the uplink transmission is transmitted with the uplink TA.

In some aspects, the base station may determine a second GI based at least in part on the reference signal (e.g., when the reference signal is associated with a sidelink channel). For example, the base station may use sidelink propagation delay (e.g., detected by the base station and/or reported to the base station by the UE) to determine the TA that the UE should use to transmit sidelink communications to another UE. In some aspects, the base station may use the TA to determine a length of the second GI to be used by the UE when transmitting sidelink communications to the other UE. For example, the base station may determine that the second GI length should be sufficient to align the symbols of a sidelink transmission at the base station the sidelink transmission is transmitted with the sidelink TA.

As shown by reference number 715, the base station may transmit, and the UE may receive, first configuration information indicating the first guard interval. In some aspects, the UE may receive the first configuration information from another device (e.g., from another base station or another UE). In some aspects, the UE may receive the configuration information via radio resource control (RRC) signaling and/or medium access control (MAC) signaling (e.g., MAC control elements (MAC CEs)). In some aspects, the first configuration information may include an indication of one or more configuration parameters (e.g., already known to the UE) for selection by the UE and/or explicit configuration information for the UE to use to configure the UE. For example, the first configuration information may include an $N_{TA}$ value that the UE may use to set a TA and/or GI for uplink transmissions to the base station, as described herein.

In some aspects, the configuration information may indicate that the UE is to apply link specific guard intervals to uplink and/or sidelink transmissions. For example, the UE may be configured to determine a first GI for uplink communications with the base station based at least in part on one or more reference signals associated with the uplink channel. In some aspects, the configuration information may indicate that the base station may configure the UE to determine different GIs for different links and/or transmit communications on different links using different GIs. The configuration may also indicate that the base station is configured to receive sidelink communications transmitted by the UE to another UE.

As shown by reference number 720, the base station may transmit, and the UE may receive, second configuration information indicating the second guard interval. In some aspects, the UE may receive the second configuration information from another device (e.g., from another base station or another UE). In some aspects, the UE may receive the configuration information via RRC signaling and/or MAC signaling (e.g., MAC CEs). In some aspects, the second configuration information may include an indication of one or more configuration parameters (e.g., already known to the UE) for selection by the UE and/or explicit configuration information for the UE to use to configure the UE. For example, the second configuration information may include an $N_{TA,SL}$ value that the UE may use to set a TA and/or GI for sidelink communications, as described herein.

In some aspects, the configuration information may indicate that the UE is to apply link specific guard intervals to uplink and/or sidelink transmissions. For example, the UE may be configured to determine a second GI for sidelink communications with another UE based at least in part on one or more reference signals associated with the sidelink channel. In some aspects, the configuration information may indicate that the base station may configure the UE to determine different GIs for different links and/or transmit communications on different links using different GIs. The configuration information may also indicate that the base station is configured to receive sidelink communications transmitted by the UE to another UE.

While the first configuration and the second configuration are described separately with respect to example 700, in some aspects, they may be combined as part of a single configuration process (e.g., a RACH procedure). In some aspects, additional configuration processes may be used (e.g., in response to changing network conditions, such as different Uu channel conditions, different sidelink channel conditions, different sidelink communication channels, and/or the like).

In some aspects, the base station may transmit, and the UE may receive, information indicating a third GI. For example, the UE may receive the information indicating the third GI in the first configuration information, the second configuration information, and/or third configuration information. In some aspects, the information indicating the third GI may indicate that the UE is to use different GIs for different types of sidelink communications. For example, the configuration information may indicate that the UE is to be configured to use the second GI for PSSCH communications and the third GI for PSFCH communications. In this example, the base station may use different GIs for different types of sidelink communications when the base station is only listening for a particular type of sidelink communication. For example, in a situation where the base station is monitoring PSFCH communications but not PSSCH communications, the configuration information may indicate that the UE is to use a third GI for PSFCH communications that enables alignment of the PSFCH communications at the base station while the base station ignores PSSCH communications.

In some aspects, the UE may configure the UE for communicating with the base station and/or communicating with other UEs. In some aspects, the UE may configure the UE based at least in part on the first configuration information and/or second configuration information. In some aspects, the UE may be configured to perform one or more operations described herein. For example, the UE may configure the UE to use a first guard interval (e.g., determined using the first configuration information, as described herein) when transmitting uplink communications to the base station. As another example, the UE may configure the UE to use a second guard interval (e.g., determined using the second configuration information, as described herein) when transmitting sidelink communications to another UE.

As shown by reference number 725a, the UE may transmit, and the base station and/or a second UE may receive, a sidelink communication. For example, the UE may transmit a sidelink communication to another UE (e.g., the second UE) using the second guard interval. The base station may also receive the sidelink communication. In some aspects, the UE transmits the sidelink communication using the second GI. By using the second GI, the sidelink communication may be capable of being received by both the second UE and the base station in alignment with the reception of other signals by the second UE and/or the base station.

As shown by reference number 725b, the base station may receive an uplink communication. For example, the base station may receive the uplink communication from another UE (e.g., the third UE). As indicated in the example 700, the base station receives the sidelink communication from the first UE and the uplink communication from the third UE within the same FFT window. In some aspects, the third UE may have been previously configured (e.g., as described herein) to use a third GI that would cause the uplink communication to be aligned with the sidelink communication received from the first UE.

In some aspects, the third GI may have a length that is different from the length of the second GI used by the first UE to transmit the sidelink communication. In some aspects, the second GI may be longer than the third GI. For example, to account for a difference between $N_{(TA\ Offset)}$ and $N_{TA,SL}$, sidelink communications may be configured with a greater GI length than uplink communications.

As shown by reference number 730, the base station may process the sidelink communication and the uplink communication in a same FFT window. As described herein, by receiving aligned sidelink and uplink communications, the base station may process both uplink and sidelink communications in the same FFT window, which enables the base station to handle the communications more efficiently than if multiple FFT processes were needed. In addition, and as described herein, the alignment of uplink and sidelink communications at the base station facilitates processing the uplink and sidelink communications by reducing interference.

As shown by reference number 735, the UE may transmit, and the base station may receive, an uplink communication. In some aspects, the UE transmits the uplink communication using the second GI. The second GI may have a length that is different from (e.g., shorter) than the first GI used by the UE to transmit the sidelink communication (e.g., described with respect to reference number 725a). For example, the UE may be configured to use two different GIs to enable the base station to receive the uplink communication from the UE in the same FFT window in which the base station receives another communication (e.g., another sidelink communication) from another UE. In this way, the UE is configured to transmit sidelink communications with a GI that enables the base station to receive other uplink communications from other UEs within the same FFT window, and the UE is also configured to transmit uplink communications with another GI that enables the base station to receive other sidelink communications from other UEs within the same FFT window.

As indicated above, FIG. 7 is provided as an example. Other examples may differ from what is described with regard to FIG. 7.

Figure 8:
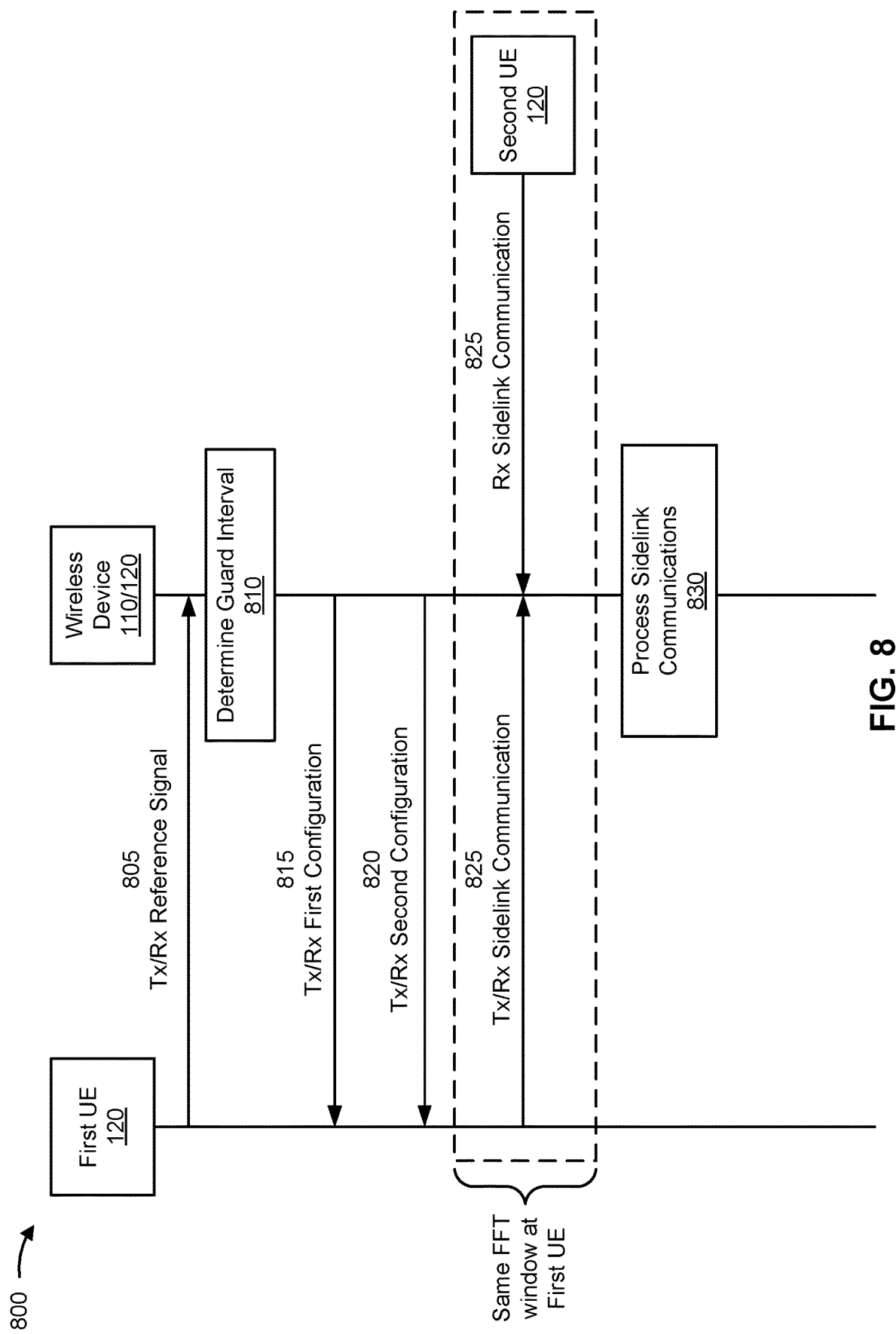
FIG. 8 is a diagram illustrating an example associated with link specific guard intervals for simultaneous sidelink reception, in accordance with the present disclosure.

FIG. 8 is a diagram illustrating an example 800 associated with link specific guard intervals for simultaneous sidelink reception, in accordance with the present disclosure. As shown in FIG. 8, a wireless device (e.g., base station 110 or UE 120) and a first UE (e.g., UE 120) may communicate with one another. Example 800 is similar to example 700 depicted in FIG. 7, and features described as being performed by the base station in example 700 may be similarly performed by the wireless device for sidelink communications, as described herein. While various steps are described as taking place between the wireless device and the first UE, any steps performed between the wireless device and the first UE may also be performed between the wireless device and the second UE and/or the first UE and the second UE.

As shown by reference number 805, the wireless device may transmit, and the first UE may receive, a reference signal, such as the reference signals described herein (e.g., with respect to reference number 705). In some aspects, the reference signals may be associated with a sidelink channel between the first UE and the wireless device.

As shown by reference number 810, the wireless device may determine a first GI based at least in part on the reference signal. For example, as described herein, the reference signal may be used to identify a propagation delay associated with sidelink communications between the first UE and the wireless device. In some aspects, as described herein, the wireless device may use a TA associated with the sidelink channel to determine a length of the GI to be used by the first UE when transmitting sidelink communications to the wireless device. For example, the wireless device may determine that the first GI length should be sufficient to align the symbols of a first sidelink transmission at the wireless device when transmitted with the sidelink TA.

In some aspects, the wireless device may determine a measure of distance associated with the first UE based at least in part on the reference signal and determine the first GI based at least in part on the measure of distance. For example, as described herein, devices that are further away may experience a longer propagation delay. In this situation, the wireless device may determine a greater GI length for UEs further from the wireless device and a shorter GI length for UEs close to the wireless device.

As shown by reference number 815, the wireless device may transmit, and the first UE may receive, first configuration information indicating the first guard interval. The first configuration information may be transmitted in a manner similar to that described herein (e.g., as shown by reference number 715). For example, the first configuration information (e.g., via sidelink control information) may include an $N_{TA,SL}$ value that the first UE may use to set a TA and/or GI for sidelink transmissions to the wireless device, as described herein.

In some aspects, the first configuration information may indicate that the first UE is to apply link specific guard intervals to sidelink transmissions. For example, the first UE may be configured to determine a first GI for sidelink communications with the wireless device based at least in part on one or more reference signals associated with the sidelink channel. In some aspects, the first configuration information may indicate that the wireless device may configure the first UE to determine different GIs for different links and/or transmit communications on different links using different GIs.

As shown by reference number 820, the wireless device may transmit, and the first UE may receive, second configuration information indicating the second guard interval. The second configuration information may be transmitted in a manner similar to that described herein (e.g., as shown by reference number 720).

In some aspects, the configuration information may indicate that the UE is to apply link specific guard intervals to uplink and/or sidelink transmissions. In some aspects, the information indicating the second GI may indicate that the first UE is to use different GIs for different types of sidelink communications. For example, the first and/or second configuration information may indicate that the first UE is to be configured to use the first GI for PSSCH communications and the second GI for PSFCH communications. In this example, the first UE may use different GIs for different types of sidelink communications when the wireless device is only listening for a particular type of sidelink communication. For example, in a situation where the wireless device is monitoring PSFCH communications but not PSSCH communications, the configuration information may indicate that the UE is to use a second GI for PSFCH communications that enables alignment of the PSFCH communications at the wireless device while the base station ignores PSSCH communications.

In some aspects, the link specific GIs may be for different methods of sidelink transmission. For example, sidelink communications may be transmitted as a unicast transmission, a groupcast transmission, or a broadcast transmission, and different GIs may be configured for different methods of sidelink transmission. In some aspects, at least one type of sidelink communication may be associated with a preconfigured GI. In this situation, the first UE may use the preconfigured GI for the corresponding type of sidelink transmissions.

As shown by reference number 825, the first UE may transmit, and the wireless device may receive, a first sidelink communication, and the second UE may transmit, and the wireless device may receive, a second sidelink communication. In some aspects, the first UE transmits the first sidelink communication using the first GI, and the second UE may transmit the second sidelink communication using a second GI. In some aspects the first and second sidelink communications may be associated with different types of sidelink communications and/or different methods of sidelink transmission, as described herein. By using the first and second GIs, the sidelink communications may be capable of being received by the wireless device in alignment and during the same FFT window.

As shown by reference number 830, the wireless device may process the first sidelink communication and the second sidelink communication in the same FFT window. As described herein, by receiving aligned sidelink communications, the wireless device may process both sidelink communications in the same FFT window, which enables the wireless device to handle the communications more efficiently than if multiple FFT processes were needed. In addition, and as described herein, the alignment of sidelink communications at the wireless device facilitates processing the uplink and sidelink communications by reducing interference.

As indicated above, FIG. 8 is provided as an example. Other examples may differ from what is described with respect to FIG. 8.

Figure 9:
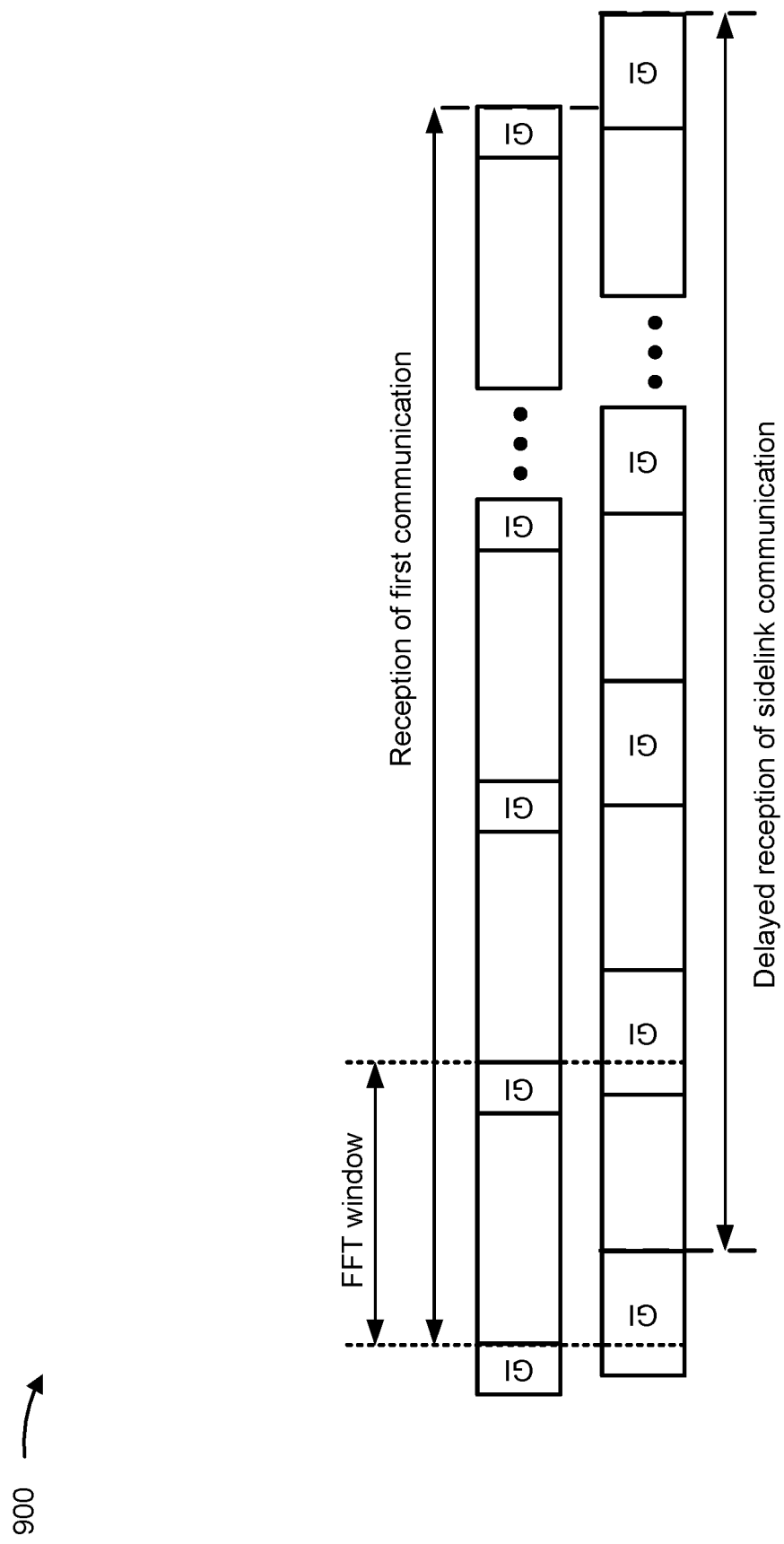
FIG. 9 is a diagram illustrating an example associated with link specific guard intervals, in accordance with the present disclosure.

FIG. 9 is a diagram illustrating an example 900 associated with link specific GIs, in accordance with the present disclosure. FIG. 9 depicts alignment of two communications received by a receiver (e.g., a base station 110 or UE 120). For example, the first communication arrives before the sidelink communication, but the different GIs place the FFT block of data within the FFT window for both communications. In this example, the first communication has a GI length that is less than the GI length of the second communication. This may be, for example, due to the first communication being an uplink communication having a TA greater than the TA of the second communication. As another example, the first communication may also be a sidelink communication for a transmitter that is closer to the receiver, in which case a smaller GI may be selected due to a propagation delay of the first communication being less than a propagation delay of the second communication.

As indicated above, FIG. 9 is provided as an example. Other examples may differ from what is described with respect to FIG. 9.

In this way, some techniques and apparatuses described herein enable link specific GIs to be configured, such that different links may use different GIs, enabling a receiving device (e.g., a base station or UE) to receive multiple communications aligned in the time domain via different links. For example, a base station may receive a sidelink communication using a first GI, and an uplink communication using a second GI. The different GIs may align the sidelink and uplink communication, which may reduce interference and enable the base station to process the communications in the same FFT window. Similarly, a UE or base station may receive two sidelink communications from two different UEs with two different GIs. The different GIs may align the sidelink communications, which may reduce interference and enable the UE or the base station to process the sidelink communications in the same FFT window. As a result, the reduction in interference may improve the quality of sidelink and Uu communications, reducing bandwidth that would be wasted on retransmitting interfering signals. In addition, the ability to use one FFT window for processing multiple communications may improve the processing efficiency of devices that receive multiple communications that are aligned using link specific GIs. Reducing the need for additional transmissions and/or additional processing may also conserve power resources consumed by both transmitters and receivers. Furthermore, by using link specific GIs, rather than a fixed GI or CP for all communications, overhead may be reduced by enabling some communications to use a shorter GI, which may enable the communications using the short GI to include more data per symbol, reducing overhead and increasing efficiency.

Figure 10:
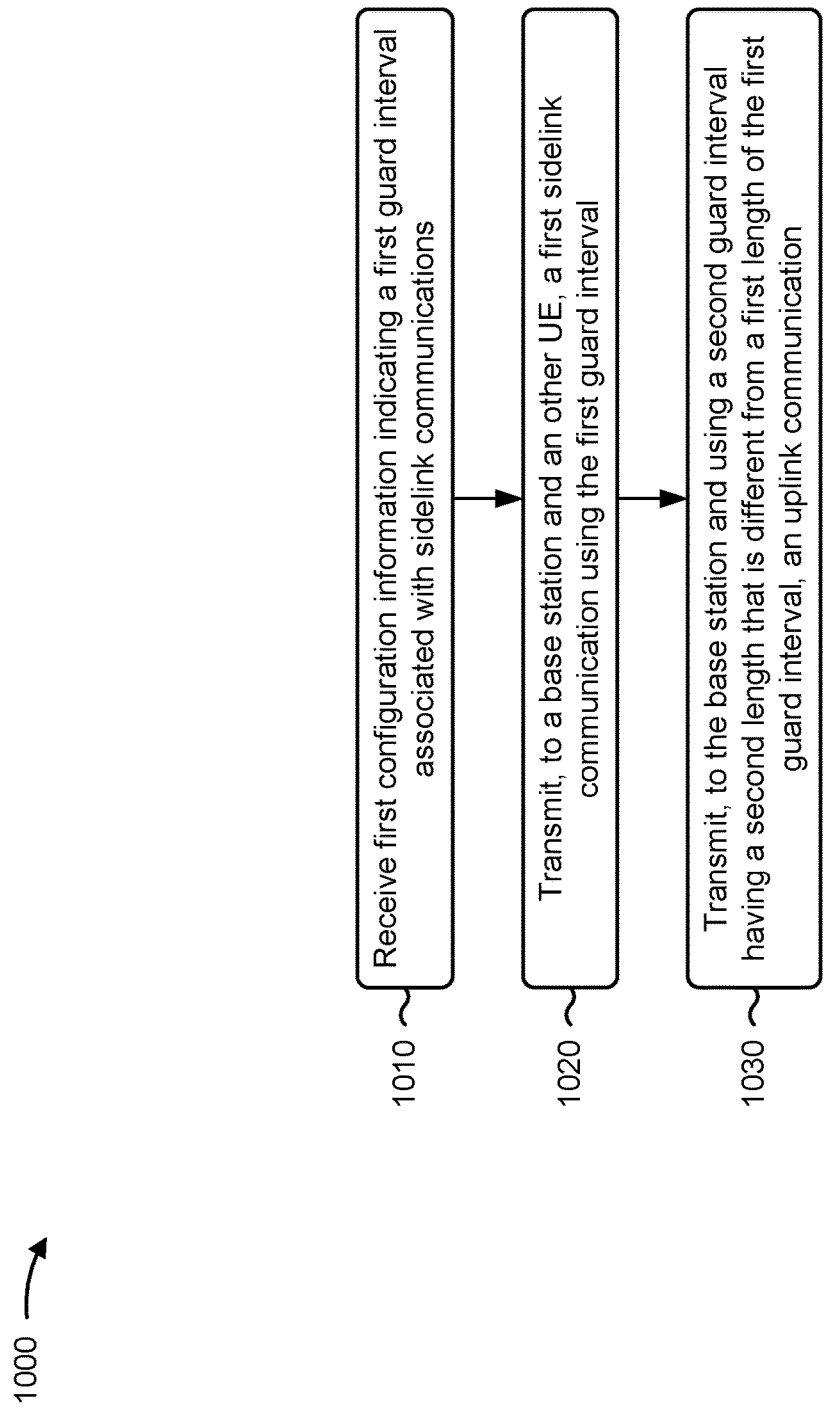
FIGS. 10-12 are diagrams illustrating example processes associated with link specific guard intervals, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with link specific GIs.

As shown in FIG. 10, in some aspects, process 1000 may include receiving first configuration information indicating a first guard interval associated with sidelink communications (block 1010). For example, the UE (e.g., using communication manager 140 and/or reception component 1302, depicted in FIG. 13) may receive first configuration information indicating a first guard interval associated with sidelink communications, as described above, for example, with reference to FIGS. 7, 8, and/or 9.

As further shown in FIG. 10, in some aspects, process 1000 may include transmitting, to a base station and another UE, a first sidelink communication using the first guard interval (block 1020). For example, the UE (e.g., using communication manager 140 and/or transmission component 1304, depicted in FIG. 13) may transmit, to a base station and another UE, a first sidelink communication using the first guard interval, as described above, for example, with reference to FIGS. 7, 8, and/or 9.

As further shown in FIG. 10, in some aspects, process 1000 may include transmitting, to the base station and using a second guard interval having a second length that is different from a first length of the first guard interval, an uplink communication (block 1030). For example, the UE (e.g., using communication manager 140 and/or transmission component 1304, depicted in FIG. 13) may transmit, to the base station and using a second guard interval having a second length that is different from a first length of the first guard interval, an uplink communication, as described above, for example, with reference to FIGS. 7, 8, and/or 9.

Process 1000 may include additional aspects, such as any single aspect or any combination of aspects described below and/or in connection with one or more other processes described elsewhere herein.

In a first aspect, process 1000 includes receiving, from the base station, second configuration information indicating the second guard interval.

In a second aspect, alone or in combination with the first aspect, process 1000 includes transmitting, to at least one of the base station or the other UE, a second sidelink communication using a third guard interval that is different from the first guard interval.

In a third aspect, alone or in combination with one or more of the first and second aspects, the first sidelink communication is a PSSCH communication, and the second sidelink communication is a PSFCH communication.

In a fourth aspect, alone or in combination with one or more of the first through third aspects, the first sidelink communication is a PSFCH communication, and the second sidelink communication is a PSSCH communication.

In a fifth aspect, alone or in combination with one or more of the first through fourth aspects, the first configuration information further indicates the third guard interval.

In a sixth aspect, alone or in combination with one or more of the first through fifth aspects, the second length of the second guard interval is longer than the first length of the first guard interval.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
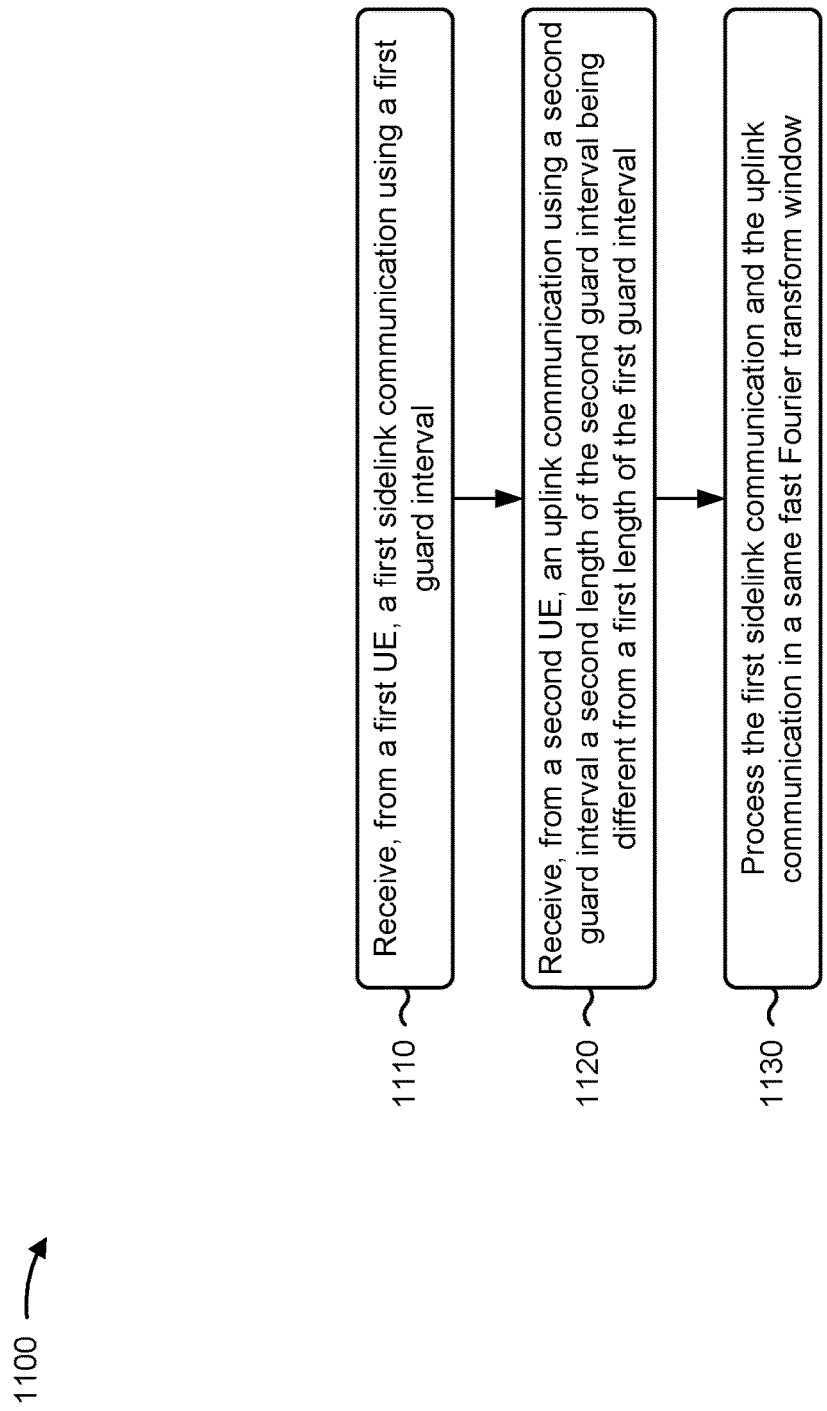

FIG. 11 is a diagram illustrating an example process 1100 performed, for example, by a base station, in accordance with the present disclosure. Example process 1100 is an example where the base station (e.g., base station 110) performs operations associated with link specific GIs.

As shown in FIG. 11, in some aspects, process 1100 may include receiving, from a first UE, a first sidelink communication using a first guard interval (block 1110). For example, the base station (e.g., using communication manager 150 and/or reception component 1402, depicted in FIG. 14) may receive, from a first UE, a first sidelink communication using a first guard interval, as described above, for example, with reference to FIGS. 7, 8, and/or 9.

As further shown in FIG. 11, in some aspects, process 1100 may include receiving, from a second UE, an uplink communication using a second guard interval, a second length of the second guard interval being different from a first length of the first guard interval (block 1120). For example, the base station (e.g., using communication manager 150 and/or reception component 1402, depicted in FIG. 14) may receive, from a second UE, an uplink communication using a second guard interval, a second length of the second guard interval being different from a first length of the first guard interval, as described above, for example, with reference to FIGS. 7, 8, and/or 9.

As further shown in FIG. 11, in some aspects, process 1100 may include processing the first sidelink communication and the uplink communication in a same fast Fourier transform window (block 1130). For example, the base station (e.g., using communication manager 150 and/or FFT component 1408, depicted in FIG. 14) may process the first sidelink communication and the uplink communication in a same FFT window, as described above, for example, with reference to FIGS. 7, 8, and/or 9.

Process 1100 may include additional aspects, such as any single aspect or any combination of aspects described below and/or in connection with one or more other processes described elsewhere herein.

In a first aspect, the second length of the second guard interval is longer than the first length of the first guard interval.

In a second aspect, alone or in combination with the first aspect, process 1100 includes transmitting, to the first UE, first configuration information indicating the first guard interval.

In a third aspect, alone or in combination with one or more of the first and second aspects, process 1100 includes receiving, from the first UE, a reference signal, and determining the first guard interval based at least in part on the reference signal.

In a fourth aspect, alone or in combination with one or more of the first through third aspects, process 1100 includes transmitting, to the second UE, second configuration information indicating the second guard interval.

In a fifth aspect, alone or in combination with one or more of the first through fourth aspects, process 1100 includes receiving, from the first UE, a second sidelink communication using a third guard interval that is different from the first guard interval.

In a sixth aspect, alone or in combination with one or more of the first through fifth aspects, the first sidelink communication is a PSSCH communication, and the second sidelink communication is a PSFCH communication.

In a seventh aspect, alone or in combination with one or more of the first through sixth aspects, the first sidelink communication is a PSFCH communication, and the second sidelink communication is a PSSCH communication.

In an eighth aspect, alone or in combination with one or more of the first through seventh aspects, process 1100 includes transmitting, to the first UE, first configuration information indicating the first guard interval and the third guard interval.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
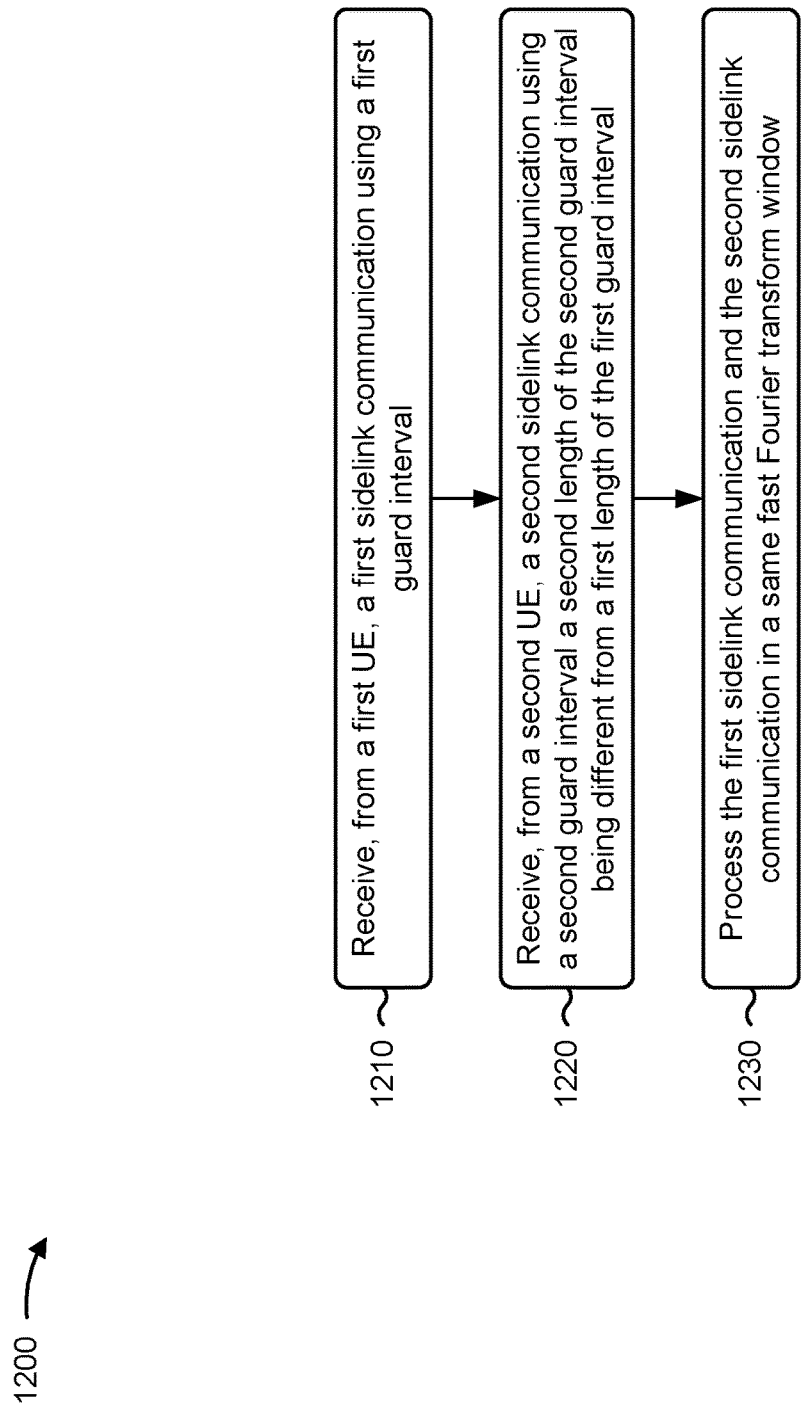

FIG. 12 is a diagram illustrating an example process 1200 performed, for example, by a wireless device, in accordance with the present disclosure. Example process 1200 is an example where the wireless device (e.g., base station 110 or UE 120) performs operations associated with link specific GIs.

As shown in FIG. 12, in some aspects, process 1200 may include receiving, from a first UE, a first sidelink communication using a first guard interval (block 1210). For example, the wireless device (e.g., using communication manager 140 or 150 and/or reception component 1302 or 1402, depicted in FIGS. 13 and 14) may receive, from a first UE, a first sidelink communication using a first guard interval, as described above, for example, with reference to FIGS. 7, 8, and/or 9.

As further shown in FIG. 12, in some aspects, process 1200 may include receiving, from a second UE, a second sidelink communication using a second guard interval, a second length of the second guard interval being different from a first length of the first guard interval (block 1220). For example, the wireless device (e.g., using communication manager 140 or 150 and/or reception component 1302 or 1402, depicted in FIGS. 13 and 14) may receive, from a second UE, a second sidelink communication using a second guard interval, a second length of the second guard interval being different from a first length of the first guard interval, as described above, for example, with reference to FIGS. 7, 8, and/or 9.

As further shown in FIG. 12, in some aspects, process 1200 may include processing the first sidelink communication and the second sidelink communication in a same fast Fourier transform window (block 1230). For example, the wireless device (e.g., using communication manager 140 or 150 and/or FFT component 1308 or 1408, depicted in FIGS. 13 and 14) may process the first sidelink communication and the second sidelink communication in a same fast Fourier transform window, as described above, for example, with reference to FIGS. 7, 8, and/or 9.

Process 1200 may include additional aspects, such as any single aspect or any combination of aspects described below and/or in connection with one or more other processes described elsewhere herein.

In a first aspect, the first sidelink communication comprises one of a unicast transmission, a groupcast transmission, or a broadcast transmission, and the second sidelink communication comprises a different one of the unicast transmission, the groupcast transmission, or the broadcast transmission.

In a second aspect, alone or in combination with the first aspect, the second length of the second guard interval is longer than the first length of the first guard interval.

In a third aspect, alone or in combination with one or more of the first and second aspects, process 1200 includes transmitting, to the second UE, second configuration information indicating the second guard interval.

In a fourth aspect, alone or in combination with one or more of the first through third aspects, process 1200 includes receiving, from the first UE, a third sidelink communication using a third guard interval having a third length that is different from the first length of the first guard interval.

In a fifth aspect, alone or in combination with one or more of the first through fourth aspects, the first sidelink communication is a PSSCH communication, and the third sidelink communication is a PSFCH communication.

In a sixth aspect, alone or in combination with one or more of the first through fifth aspects, the first sidelink communication is a PSFCH communication, and the third sidelink communication is a PSSCH communication.

In a seventh aspect, alone or in combination with one or more of the first through sixth aspects, process 1200 includes transmitting, to the first UE, first configuration information indicating the first guard interval and the third guard interval.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
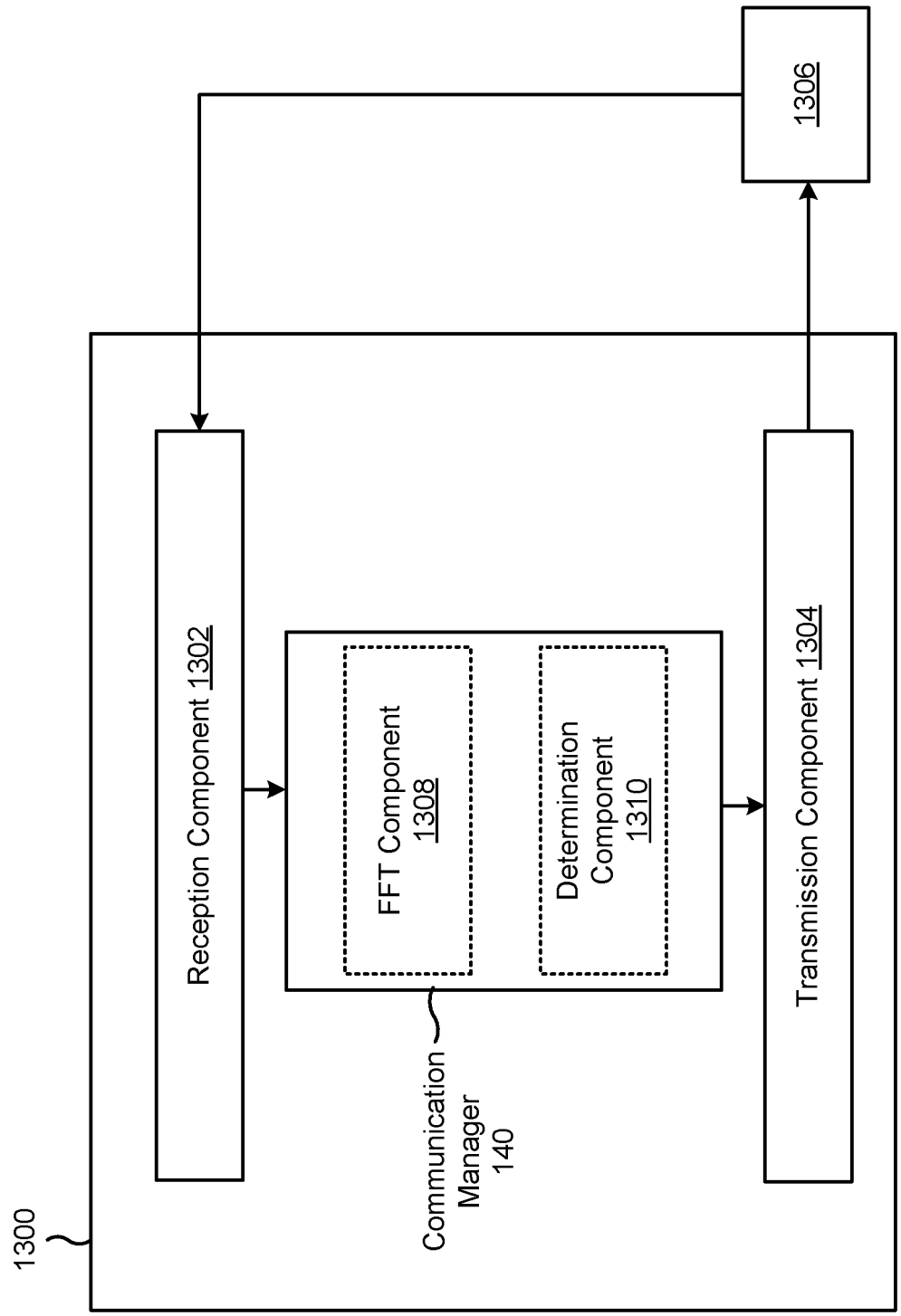
FIGS. 13 and 14 are diagrams of example apparatuses for wireless communication, in accordance with the present disclosure.

FIG. 13 is a diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 140. The communication manager 140 may include one or more of an FFT component 1308 or a determination component 1310, among other examples.

In some aspects, the apparatus 1300 may be configured to perform one or more operations described herein in connection with FIGS. 3-12. Additionally, or alternatively, the apparatus 1300 may be configured to perform one or more processes described herein, such as process 1000 of FIG. 10, process 1200 of FIG. 12, or a combination thereof. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

The reception component 1302 may receive first configuration information indicating a first guard interval associated with sidelink communications. The transmission component 1304 may transmit, to a base station and another UE, a first sidelink communication using the first guard interval. The transmission component 1304 may transmit, to the base station and using a second guard interval having a second length that is different from a first length of the first guard interval, an uplink communication.

The reception component 1302 may receive, from the base station, second configuration information indicating the second guard interval.

The transmission component 1304 may transmit, to at least one of the base station or the other UE, a second sidelink communication using a third guard interval that is different from the first guard interval.

The reception component 1302 may receive, from a first UE, a first sidelink communication using a first guard interval. The reception component 1302 may receive, from a second UE, a second sidelink communication using a second guard interval, a second length of the second guard interval being different from a first length of the first guard interval. The FFT component 1308 may process the first sidelink communication and the second sidelink communication in a same fast Fourier transform window.

The transmission component 1304 may transmit, to the first UE, first configuration information indicating the first guard interval, wherein the second guard interval is a preconfigured guard interval.

The reception component 1302 may receive, from the first UE, a reference signal.

The determination component 1310 may determine the first guard interval based at least in part on the reference signal.

The transmission component 1304 may transmit, to the second UE, second configuration information indicating the second guard interval.

The reception component 1302 may receive, from the first UE, a third sidelink communication using a third guard interval having a third length that is different from the first length of the first guard interval.

The transmission component 1304 may transmit, to the first UE, first configuration information indicating the first guard interval and the third guard interval.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
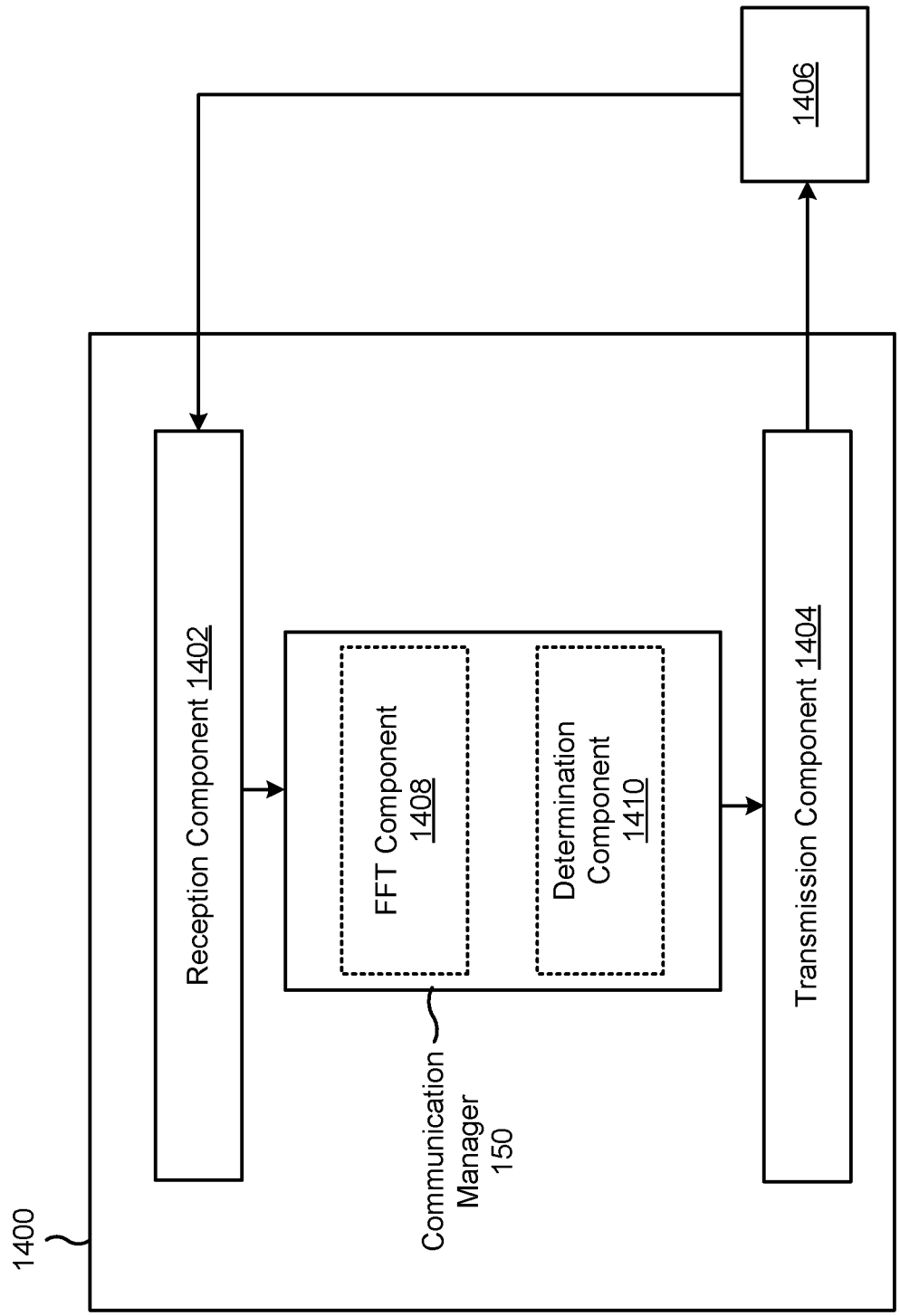

FIG. 14 is a diagram of an example apparatus 1400 for wireless communication. The apparatus 1400 may be a base station, or a base station may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 150. The communication manager 150 may include one or more of an FFT component 1408 or a determination component 1410, among other examples.

In some aspects, the apparatus 1400 may be configured to perform one or more operations described herein in connection with FIGS. 3-12. Additionally, or alternatively, the apparatus 1400 may be configured to perform one or more processes described herein, such as process 1100 of FIG. 11, process 1200 of FIG. 12, or a combination thereof. In some aspects, the apparatus 1400 and/or one or more components shown in FIG. 14 may include one or more components of the base station described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the base station described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the base station described in connection with FIG. 2. In some aspects, the transmission component 1404 may be co-located with the reception component 1402 in a transceiver.

The reception component 1402 may receive, from a first UE, a first sidelink communication using a first guard interval. The reception component 1402 may receive, from a second UE, an uplink communication using a second guard interval, a second length of the second guard interval being different from a first length of the first guard interval. The FFT component 1408 may process the first sidelink communication and the uplink communication in a same fast Fourier transform window.

The transmission component 1404 may transmit, to the first UE, first configuration information indicating the first guard interval.

The reception component 1402 may receive, from the first UE, a reference signal.

The determination component 1410 may determine the first guard interval based at least in part on the reference signal.

The transmission component 1404 may transmit, to the second UE, second configuration information indicating the second guard interval.

The reception component 1402 may receive, from the first UE, a second sidelink communication using a third guard interval that is different from the first guard interval.

The transmission component 1404 may transmit, to the first UE, first configuration information indicating the first guard interval and the third guard interval.

The reception component 1402 may receive, from a first UE, a first sidelink communication using a first guard interval. The reception component 1402 may receive, from a second UE, a second sidelink communication using a second guard interval, a second length of the second guard interval being different from a first length of the first guard interval. The FFT component 1408 may process the first sidelink communication and the second sidelink communication in a same fast Fourier transform window.

The transmission component 1404 may transmit, to the first UE, first configuration information indicating the first guard interval, wherein the second guard interval is a preconfigured guard interval.

The reception component 1402 may receive, from the first UE, a reference signal.

The determination component 1410 may determine the first guard interval based at least in part on the reference signal.

The transmission component 1404 may transmit, to the second UE, second configuration information indicating the second guard interval.

The reception component 1402 may receive, from the first UE, a third sidelink communication using a third guard interval having a third length that is different from the first length of the first guard interval.

The transmission component 1404 may transmit, to the first UE, first configuration information indicating the first guard interval and the third guard interval.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a user equipment (UE), comprising: receiving first configuration information indicating a first guard interval associated with sidelink communications; transmitting, to a base station and another UE, a first sidelink communication using the first guard interval; and transmitting, to the base station and using a second guard interval having a second length that is different from a first length of the first guard interval, an uplink communication.

Aspect 2: The method of Aspect 1, further comprising: receiving, from the base station, second configuration information indicating the second guard interval.

Aspect 3: The method of any of Aspects 1-2, further comprising: transmitting, to at least one of the base station or the other UE, a second sidelink communication using a third guard interval that is different from the first guard interval.

Aspect 4: The method of Aspect 3, wherein the first sidelink communication is a PSSCH communication, and the second sidelink communication is a PSFCH communication.

Aspect 5: The method of Aspect 3, wherein the first sidelink communication is a PSFCH communication, and the second sidelink communication is a PSSCH communication.

Aspect 6: The method of Aspect 3, wherein the first configuration information further indicates the third guard interval.

Aspect 7: The method of any of Aspects 1-6, wherein the second length of the second guard interval is longer than the first length of the first guard interval.

Aspect 8: A method of wireless communication performed by a base station, comprising: receiving, from a first UE, a first sidelink communication using a first guard interval; receiving, from a second UE, an uplink communication using a second guard interval, a second length of the second guard interval being different from a first length of the first guard interval; and processing the first sidelink communication and the uplink communication in a same fast Fourier transform window.

Aspect 9: The method of Aspect 8, wherein the second length of the second guard interval is longer than the first length of the first guard interval.

Aspect 10: The method of any of Aspects 8-9, further comprising: transmitting, to the first UE, first configuration information indicating the first guard interval.

Aspect 11: The method of Aspect 10, further comprising: receiving, from the first UE, a reference signal; and determining the first guard interval based at least in part on the reference signal.

Aspect 12: The method of any of Aspects 8-11, further comprising: transmitting, to the second UE, second configuration information indicating the second guard interval.

Aspect 13: The method of any of Aspects 8-11, further comprising: receiving, from the first UE, a second sidelink communication using a third guard interval that is different from the first guard interval.

Aspect 14: The method of Aspect 13, wherein the first sidelink communication is a PSSCH communication, and the second sidelink communication is a PSFCH communication.

Aspect 15: The method of Aspect 13, wherein the first sidelink communication is a PSFCH communication, and the second sidelink communication is a PSSCH communication.

Aspect 16: The method of Aspect 13, further comprising: transmitting, to the first UE, first configuration information indicating the first guard interval and the third guard interval.

Aspect 17: A method of wireless communication performed by a wireless device, comprising: receiving, from a first UE, a first sidelink communication using a first guard interval; receiving, from a second UE, a second sidelink communication using a second guard interval, a second length of the second guard interval being different from a first length of the first guard interval; and processing the first sidelink communication and the second sidelink communication in a same fast Fourier transform window.

Aspect 18: The method of Aspect 17, wherein the first sidelink communication comprises one of a unicast transmission, a groupcast transmission, or a broadcast transmission, and wherein the second sidelink communication comprises a different one of the unicast transmission, the groupcast transmission, or the broadcast transmission.

Aspect 19: The method of any of Aspects 17-18, wherein the second length of the second guard interval is longer than the first length of the first guard interval.

Aspect 20: The method of any of Aspects 17-19, further comprising: transmitting, to the first UE, first configuration information indicating the first guard interval, and wherein the second guard interval is a preconfigured guard interval.

Aspect 21: The method of Aspect 20, further comprising: receiving, from the first UE, a reference signal; and determining the first guard interval based at least in part on the reference signal.

Aspect 22: The method of Aspect 21, wherein determining the first guard interval comprises: determining a measure of distance associated with the first UE based at least in part on the reference signal; and determining the first guard interval based at least in part on the measure of distance.

Aspect 23: The method of any of Aspects 17-22, further comprising: transmitting, to the second UE, second configuration information indicating the second guard interval.

Aspect 24: The method of any of Aspects 17-22, further comprising: receiving, from the first UE, a third sidelink communication using a third guard interval having a third length that is different from the first length of the first guard interval.

Aspect 25: The method of Aspect 24, wherein the first sidelink communication is a PSSCH communication, and the third sidelink communication is a PSFCH communication.

Aspect 26: The method of Aspect 24, wherein the first sidelink communication is a PSFCH communication, and the third sidelink communication is a PSSCH communication.

Aspect 27: The method of Aspect 24, further comprising: transmitting, to the first UE, first configuration information indicating the first guard interval and the third guard interval.

Aspect 28: An apparatus for wireless communication at a device, comprising a processor; memory coupled with the processor; and instructions stored in the memory and executable by the processor to cause the apparatus to perform the method of one or more of Aspects 1-7.

Aspect 29: An apparatus for wireless communication at a device, comprising a processor; memory coupled with the processor; and instructions stored in the memory and executable by the processor to cause the apparatus to perform the method of one or more of Aspects 8-16.

Aspect 30: An apparatus for wireless communication at a device, comprising a processor; memory coupled with the processor; and instructions stored in the memory and executable by the processor to cause the apparatus to perform the method of one or more of Aspects 17-27.

Aspect 31: A device for wireless communication, comprising a memory and one or more processors coupled to the memory, the one or more processors configured to perform the method of one or more of Aspects 1-7.

Aspect 32: A device for wireless communication, comprising a memory and one or more processors coupled to the memory, the one or more processors configured to perform the method of one or more of Aspects 8-16.

Aspect 33: A device for wireless communication, comprising a memory and one or more processors coupled to the memory, the one or more processors configured to perform the method of one or more of Aspects 17-27.

Aspect 34: An apparatus for wireless communication, comprising at least one means for performing the method of one or more of Aspects 1-7.

Aspect 35: An apparatus for wireless communication, comprising at least one means for performing the method of one or more of Aspects 8-16.

Aspect 36: An apparatus for wireless communication, comprising at least one means for performing the method of one or more of Aspects 17-27.

Aspect 37: A non-transitory computer-readable medium storing code for wireless communication, the code comprising instructions executable by a processor to perform the method of one or more of Aspects 1-7.

Aspect 38: A non-transitory computer-readable medium storing code for wireless communication, the code comprising instructions executable by a processor to perform the method of one or more of Aspects 8-16.

Aspect 39: A non-transitory computer-readable medium storing code for wireless communication, the code comprising instructions executable by a processor to perform the method of one or more of Aspects 17-27.

Aspect 40: A non-transitory computer-readable medium storing a set of instructions for wireless communication, the set of instructions comprising one or more instructions that, when executed by one or more processors of a device, cause the device to perform the method of one or more of Aspects 1-7.

Aspect 41: A non-transitory computer-readable medium storing a set of instructions for wireless communication, the set of instructions comprising one or more instructions that, when executed by one or more processors of a device, cause the device to perform the method of one or more of Aspects 8-16.

Aspect 42: A non-transitory computer-readable medium storing a set of instructions for wireless communication, the set of instructions comprising one or more instructions that, when executed by one or more processors of a device, cause the device to perform the method of one or more of Aspects 17-27.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      receive first configuration information indicating a first guard interval associated with sidelink communications;
      transmit, to a base station and an other UE, a first sidelink communication using the first guard interval; and
      transmit, to the base station and using a second guard interval having a second length that is different from a first length of the first guard interval, an uplink communication.

2. The UE of claim 1, wherein the one or more processors are further configured to: receive, from the base station, second configuration information indicating the second guard interval.

3. The UE of claim 1, wherein the one or more processors are further configured to: transmit, to at least one of the base station or the other UE, a second sidelink communication using a third guard interval that is different from the first guard interval.

4. The UE of claim 3, wherein the first sidelink communication is a physical sidelink shared channel (PSSCH) communication, and the second sidelink communication is a physical sidelink feedback channel (PSFCH) communication.

5. The UE of claim 3, wherein the first sidelink communication is a physical sidelink feedback channel (PSFCH) communication, and the second sidelink communication is a physical sidelink shared channel (PSSCH) communication.

6. The UE of claim 3, wherein the first configuration information further indicates the third guard interval.

7. The UE of claim 1, wherein the second length of the second guard interval is longer than the first length of the first guard interval.

8. A base station for wireless communication, comprising:
   a memory; and
   one or more processors, coupled to the memory, configured to:
      receive, from a first UE, a first sidelink communication using a first guard interval;
      receive, from a second UE, an uplink communication using a second guard interval,
      a second length of the second guard interval being different from a first length of the first guard interval; and
      process the first sidelink communication and the uplink communication in a same fast Fourier transform window.

9. The base station of claim 8, wherein the second length of the second guard interval is longer than the first length of the first guard interval.

10. The base station of claim 8, wherein the one or more processors are further configured to:
    transmit, to the first UE, first configuration information indicating the first guard interval.

11. The base station of claim 10, wherein the one or more processors are further configured to:
    receive, from the first UE, a reference signal; and
    determine the first guard interval based at least in part on the reference signal.

12. The base station of claim 8, wherein the one or more processors are further configured to:

transmit, to the second UE, second configuration information indicating the second guard interval.

13. The base station of claim 8, wherein the one or more processors are further configured to:
receive, from the first UE, a second sidelink communication using a third guard interval that is different from the first guard interval.

14. The base station of claim 13, wherein the first sidelink communication is a physical sidelink shared channel (PSSCH) communication, and the second sidelink communication is a physical sidelink feedback channel (PSFCH) communication.

15. The base station of claim 13, wherein the first sidelink communication is a physical sidelink feedback channel (PSFCH) communication, and the second sidelink communication is a physical sidelink shared channel (PSSCH) communication.

16. The base station of claim 13, wherein the one or more processors are further configured to:
transmit, to the first UE, first configuration information indicating the first guard interval and the third guard interval.

17. A wireless device for wireless communication, comprising:
a memory; and
one or more processors, coupled to the memory, configured to:
receive, from a first UE, a first sidelink communication using a first guard interval;
receive, from a second UE, a second sidelink communication using a second guard interval,
a second length of the second guard interval being different from a first length of the first guard interval; and
process the first sidelink communication and the second sidelink communication in a same fast Fourier transform window.

18. The wireless device of claim 17, wherein the first sidelink communication comprises one of a unicast transmission, a groupcast transmission, or a broadcast transmission, and
wherein the second sidelink communication comprises a different one of the unicast transmission, the groupcast transmission, or the broadcast transmission.

19. The wireless device of claim 17, wherein the second length of the second guard interval is longer than the first length of the first guard interval.

20. The wireless device of claim 17, wherein the one or more processors are further configured to:
transmit, to the first UE, first configuration information indicating the first guard interval, and
wherein the second guard interval is a preconfigured guard interval.

21. The wireless device of claim 20, wherein the one or more processors are further configured to:

receive, from the first UE, a reference signal; and
determine the first guard interval based at least in part on the reference signal.

22. The wireless device of claim 21, wherein the one or more processors, to determine the first guard interval, are configured to:
determine a measure of distance associated with the first UE based at least in part on the reference signal; and
determine the first guard interval based at least in part on the measure of distance.

23. The wireless device of claim 17, wherein the one or more processors are further configured to:
transmit, to the second UE, second configuration information indicating the second guard interval.

24. The wireless device of claim 17, wherein the one or more processors are further configured to:
receive, from the first UE, a third sidelink communication using a third guard interval having a third length that is different from the first length of the first guard interval.

25. The wireless device of claim 24, wherein the first sidelink communication is a physical sidelink shared channel (PSSCH) communication, and the third sidelink communication is a physical sidelink feedback channel (PSFCH) communication.

26. The wireless device of claim 24, wherein the first sidelink communication is a physical sidelink feedback channel (PSFCH) communication, and the third sidelink communication is a physical sidelink shared channel (PSSCH) communication.

27. The wireless device of claim 24, wherein the one or more processors are further configured to:
transmit, to the first UE, first configuration information indicating the first guard interval and the third guard interval.

28. A method of wireless communication performed by a base station, comprising:
receiving, from a first UE, a first sidelink communication using a first guard interval;
receiving, from a second UE, an uplink communication using a second guard interval,
a second length of the second guard interval being different from a first length of the first guard interval; and
processing the first sidelink communication and the uplink communication in a same fast Fourier transform window.

29. The method of claim 28, wherein the second length of the second guard interval is longer than the first length of the first guard interval.

30. The method of claim 28, further comprising:
receiving, from the first UE, a reference signal; and
determining the first guard interval based at least in part on the reference signal.

* * * * *